(12) United States Patent
Yang et al.

(10) Patent No.: US 11,725,474 B2
(45) Date of Patent: *Aug. 15, 2023

(54) AUTOMATION OF PACKER INFLATION

(71) Applicant: Schlumberger Technology Corporation, Sugar Land, TX (US)

(72) Inventors: Bo Yang, Sugar Land, TX (US); Kai Hsu, Sugar Land, TX (US); Deopaul Dindial, Dhahran (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,042

(22) Filed: Aug. 8, 2022

(65) Prior Publication Data
US 2022/0381098 A1    Dec. 1, 2022

Related U.S. Application Data

(63) Continuation of application No. 16/720,144, filed on Dec. 19, 2019, now Pat. No. 11,408,244.
(Continued)

(51) Int. Cl.
*E21B 33/127* (2006.01)
*G01L 19/06* (2006.01)
(Continued)

(52) U.S. Cl.
CPC .......... *E21B 33/127* (2013.01); *E21B 23/06* (2013.01); *E21B 33/12* (2013.01); *E21B 47/06* (2013.01); *G01L 19/0618* (2013.01)

(58) Field of Classification Search
CPC ........ E21B 33/12; E21B 33/127; E21B 47/06; G01L 19/0618
See application file for complete search history.

(56) References Cited

U.S. PATENT DOCUMENTS 11,408,244 B2 * 8/2022 Yang ................... G01L 19/0618
2010/0263442 A1 10/2010 Hsu et al.
(Continued)

OTHER PUBLICATIONS

A. Savitzky and M.J. E. Golay, "Smoothing and Differentiation of Data by Simplified Least Squares Procedures," Anal. Chem., vol. 36, pp. 1627-1639, 1964.

*Primary Examiner* — Yong-Suk (Philip) Ro
(74) *Attorney, Agent, or Firm* — Frederick Carbone

(57) ABSTRACT

The disclosure provides for a method for setting an inflatable packer. The method includes positioning an inflatable packer within a borehole, and pumping fluid into an inflatable element of the inflatable packer using a pump that is driven by a motor. The method includes measuring pressure of the inflatable element, determining a derivative of the measured pressure with respect to time, and determining onset of restraining of the inflatable element has occurred. Upon or after determining the onset of restraining, the method includes turning off the motor or slowing down an rpm of the motor. The disclosure also provides for a system, including a computer readable medium with processor-executable instructions stored thereon that are configured to instruct a processor to execute a pressure control algorithm to control a speed of the motor in response to pressure measurement data from the pressure sensor.

17 Claims, 19 Drawing Sheets

Related U.S. Application Data

(60) Provisional application No. 62/900,993, filed on Sep. 16, 2019.

(51) Int. Cl.
*E21B 47/06* (2012.01)
*E21B 33/12* (2006.01)
*E21B 23/06* (2006.01)

(56) References Cited

U.S. PATENT DOCUMENTS

2014/0166277 A1 6/2014 Ade-Fosudo et al.
2021/0079754 A1 3/2021 Yang et al.

* cited by examiner

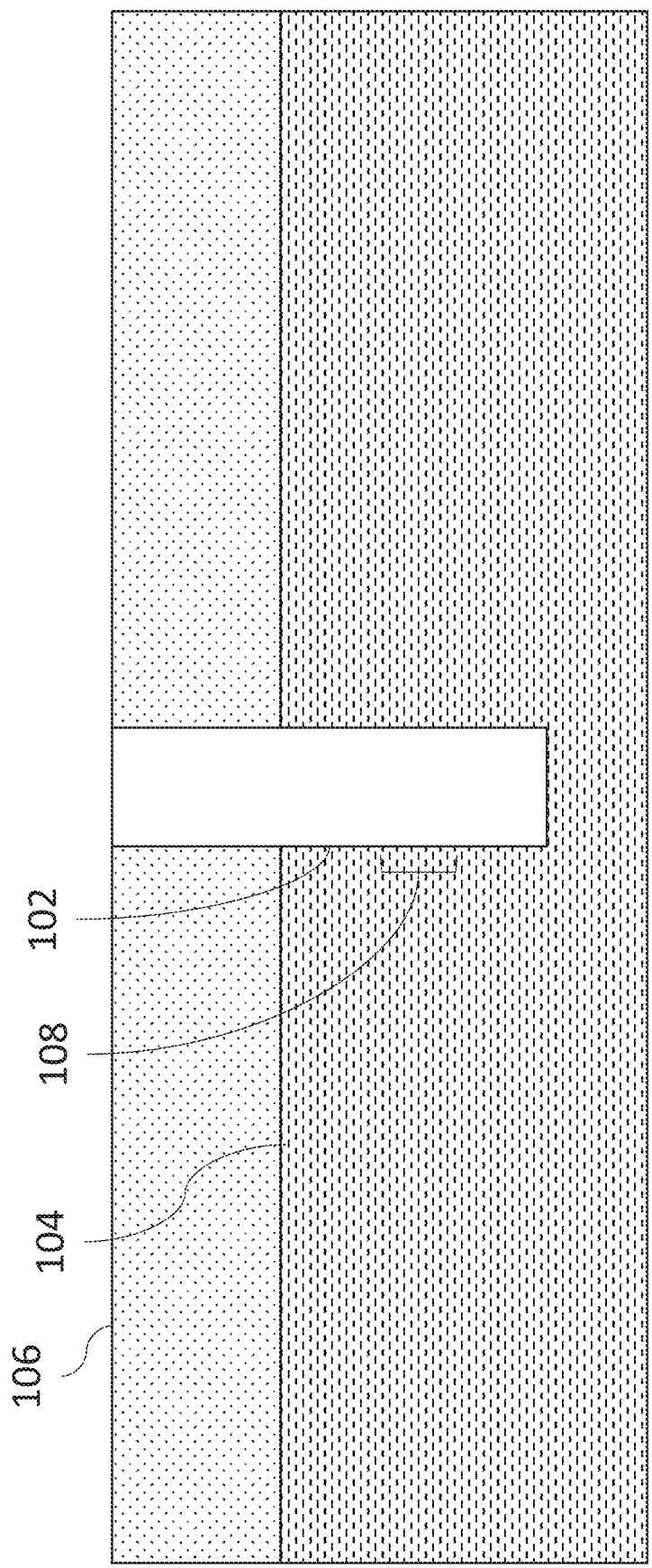

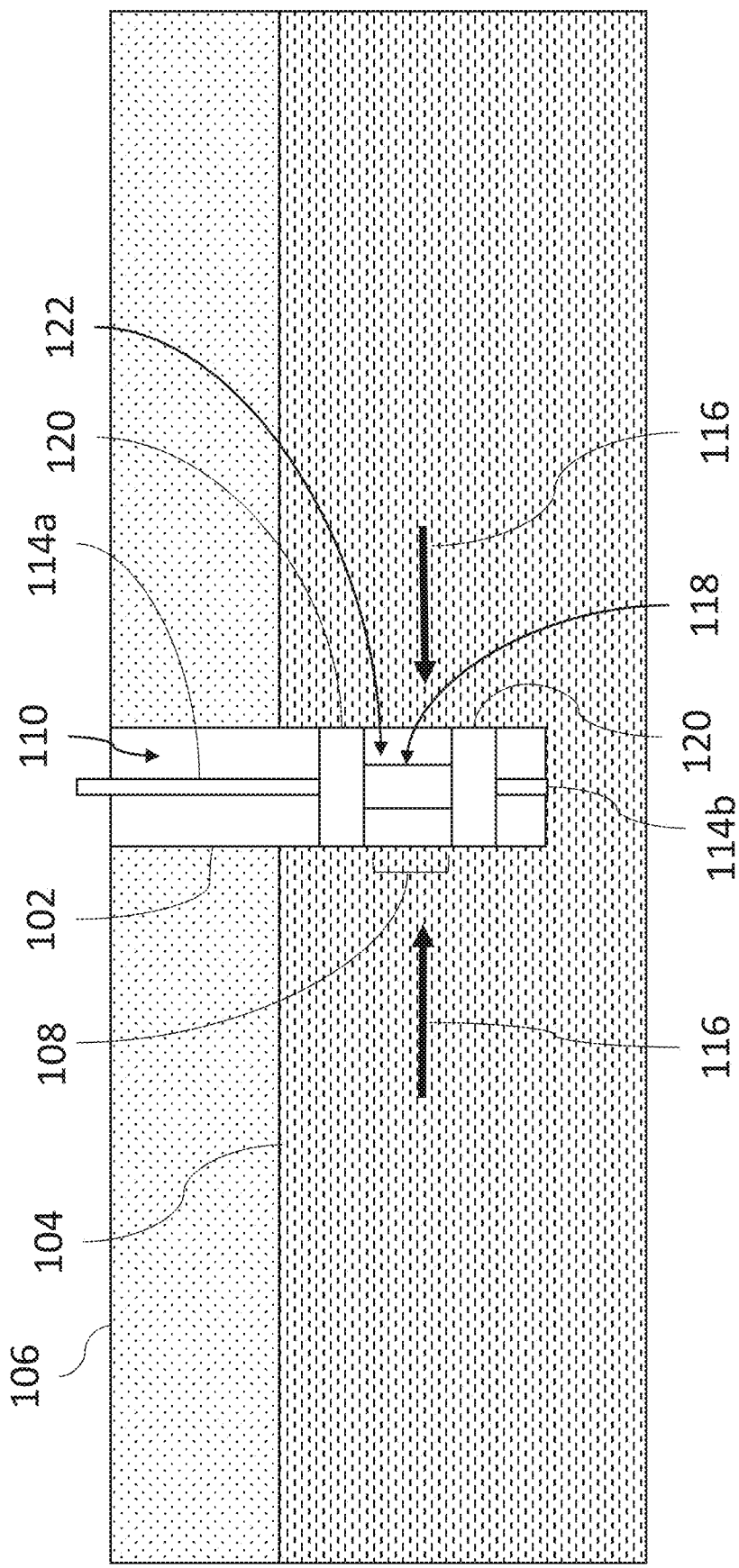

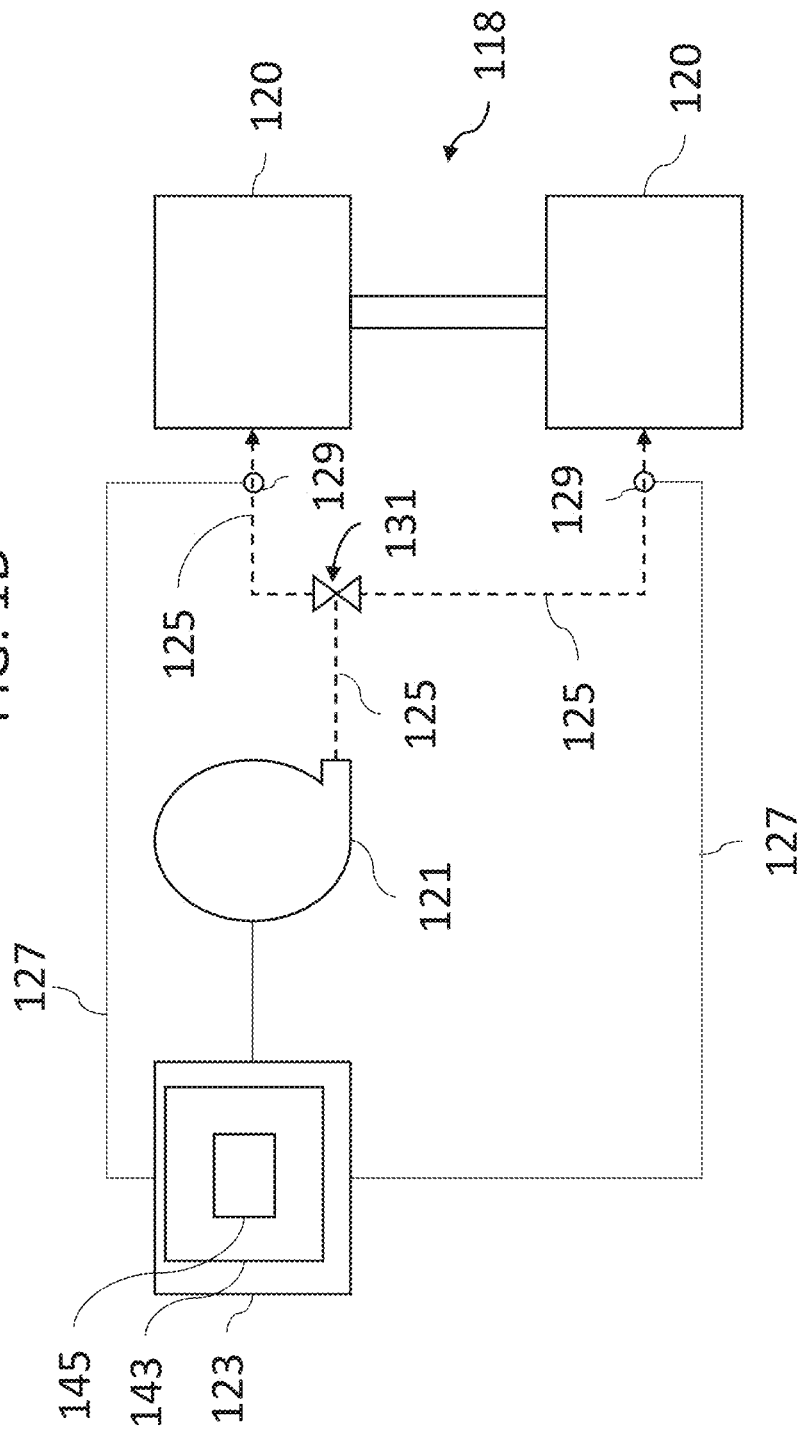

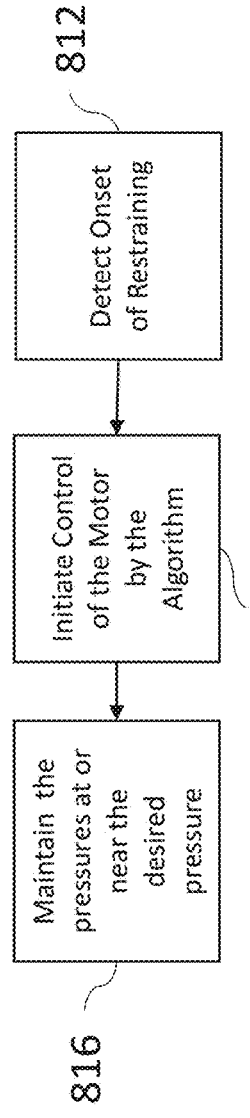
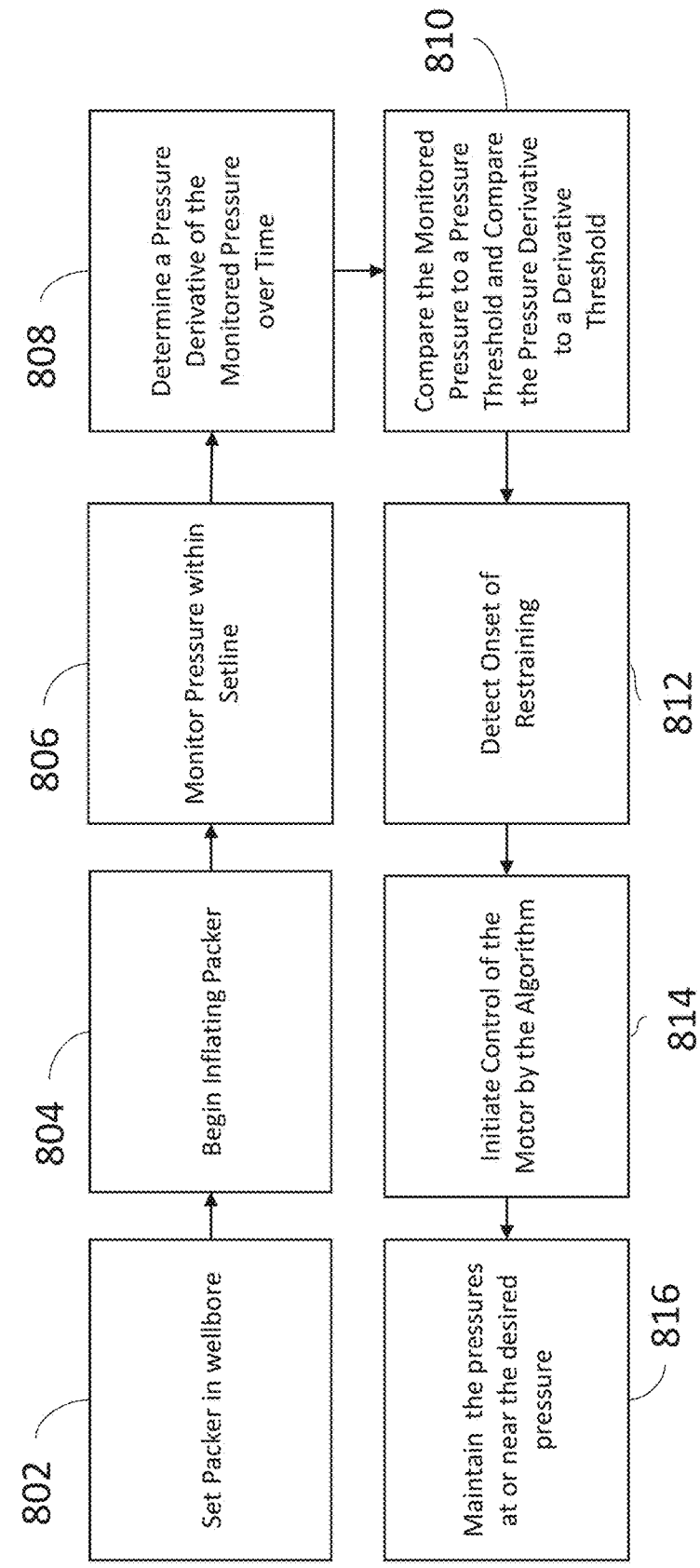
FIG. 8A
FIG. 8B

AUTOMATION OF PACKER INFLATION

CROSS-REFERENCE TO RELATED APPLICATIONS

This application is a continuation of U.S. Non-Provisional patent application Ser. No. 16/720,144, filed on Dec. 19, 2019, which claims the benefit of U.S. Provisional Patent Application No. 62/900,993, filed on Sep. 16, 2019, the entirety of which is incorporated herein by reference.

FIELD

The present disclosure relates to methods, apparatus and systems for automation of packer inflation.

BACKGROUND

During oil and gas drilling and production operations, packers are sometimes used to isolate sections of wellbores to carry out various procedures. Packers are inserted into a wellbore and then expanded to isolate a target interval of the wellbore. Inflatable packers are a type of packer that are expanded by pumping a fluid into a bladder of the packer. Inflatable packers are used in open or cased wellbores, and may be run on wireline, pipe or coiled tubing. In preparation for setting the packer, a drop ball or series of tubing movements are generally required, with the hydraulic pressure required to inflate the packer provided by applying surface pump pressure.

One application of inflatable packers is in formation testing or evaluation. Formation evaluations are performed to measure and analyze the properties of the formation fluid therein, including assessing a quantity and producibility of fluids (e.g., oil) therein. Formation evaluations can be used to determine various actions, such as the viability of a formation for production, as well as which interval(s) of a wellbore should be targeted for production purposes.

The inflation of packers, such as those of formation testing tools, typically requires operators to specify a pumping motor speed in order to control the rate of inflation of the packer and the desired inflation pressure at which the packers are engaged with formation or casing around the wellbore. That is, the rate of inflation and the timing of when to stop and start inflation is controlled. Upon receiving control commands, the motor that drives the pump is operated at the speed specified by the control command until the desired inflation pressure is reached. After the desired inflation pressure is reached, the motor is continuously operated at a reduced speed (i.e., ramping down) for, typically, a few seconds until the motor is completely stopped. Large overshoots in pressure into the packers result from the additional time within which the motor is operated. Overshoots in pressure can permanently damage and/or deform the packer elements. The size of overshoot depends on the motor speed and the time that it takes to ramp down the motor speed. While a reduction of overshoot pressure may be achieved by specifying a slower motor speed at the beginning of the inflation process, it would also prolong the time required to inflate the packers.

BRIEF SUMMARY

One embodiment of the present disclosure includes a method for setting an inflatable packer. The method includes positioning an inflatable packer within a borehole, and pumping fluid into an inflatable element of the inflatable packer using a pump that is driven by a motor. The method includes measuring pressure of the inflatable element, and determining a derivative of the measured pressure with respect to time. The method includes determining onset of restraining of the inflatable element has occurred when the derivative is equal to or greater than a derivative threshold. Upon or after determining the onset of restraining, the method includes turning off the motor or slowing down an rpm of the motor.

Another embodiment of the present disclosure includes a system for setting an inflatable packer. The system includes an inflatable packer, including an inflatable element. A pump is in fluid communication with the inflatable element. A motor is coupled with the pump to drive the pump. A pressure sensor between the pump and the inflatable element is positioned to measure pressure of the inflatable element. A motor controller is coupled with the motor. The motor controller includes a processor, a computer readable medium in communication with the processor, and processor-executable instructions stored on the computer readable medium that instruct the processor to execute a pressure control algorithm to control a speed of the motor in response to pressure measurement data from the pressure sensor.

Another embodiment of the present disclosure includes a computer readable medium including processor-executable instructions stored thereon. The processor-executable instructions are configured to instruct a processor to execute a pressure control algorithm to control a speed of a motor in response to pressure measurement data.

BRIEF DESCRIPTION OF THE DRAWINGS

So that the manner in which the features of the apparatus, systems and methods of the present disclosure may be understood in more detail, a more particular description is provided with reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 1A depicts a wellbore.

FIG. 1C depicts the wellbore of FIG. 1B with the inflatable packer inflated.

FIG. 1D is a schematic of a pumping system for inflating a packer.

FIGS. 8A and 8B are flow charts of methods of inflating a packer.

Figure 1B:
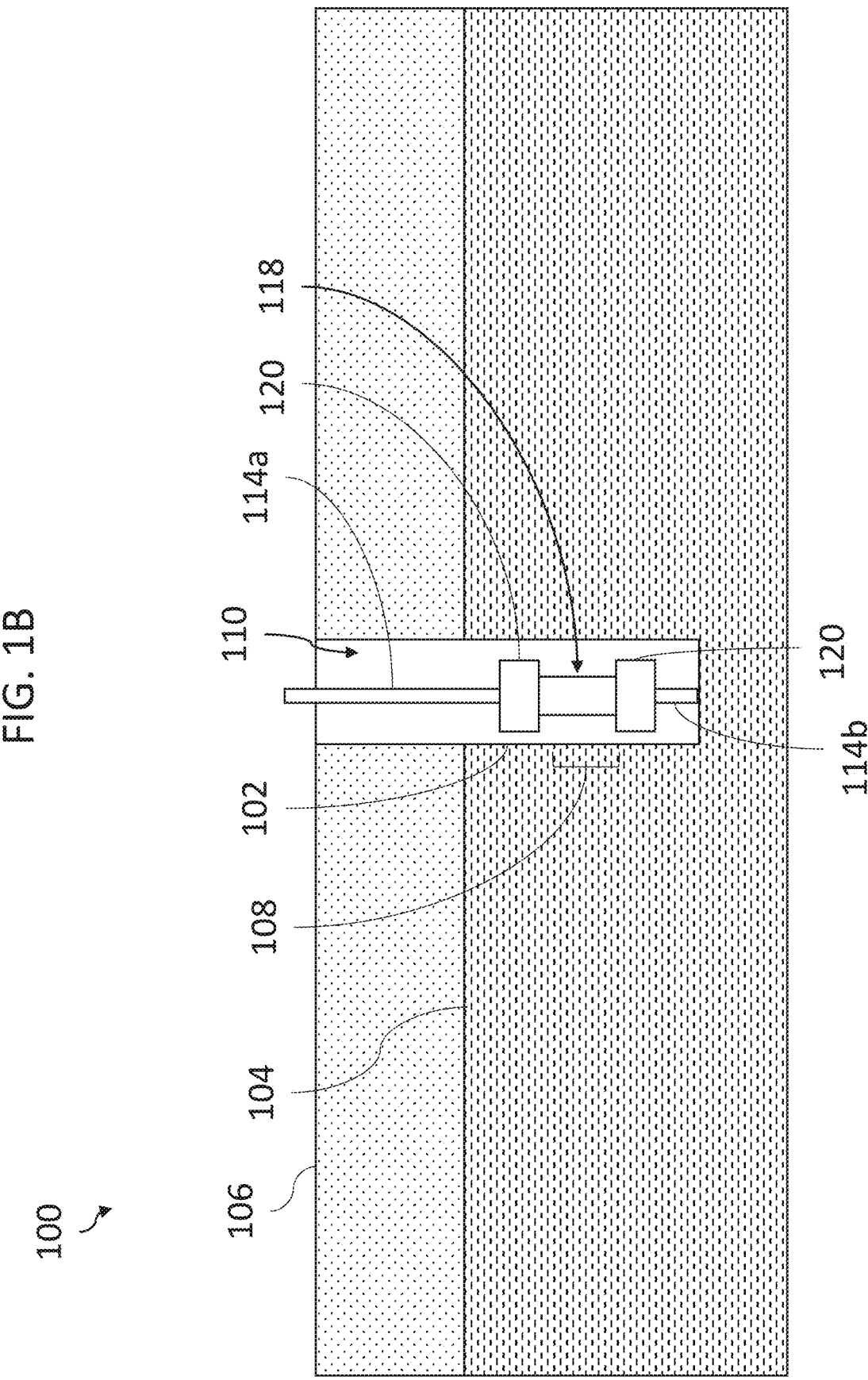
FIG. 1B depicts the wellbore of FIG. 1A with an inflatable packer positioned therein, with the inflatable packer uninflated.

Methods, apparatus, and systems according to present disclosure will now be described more fully with reference to the accompanying drawings, which illustrate various exemplary embodiments.

DETAILED DESCRIPTION

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure includes adaptive and automated methods, apparatus and systems for reducing or preventing overshoot pressure during packer inflation, and for maintaining a desired inflation pressure of packers.

With reference to FIG. 1A, wellsite 100 is depicted, including wellbore 102 intersecting formation 104 beneath surface 106. Wellbore 102 may, of course, include any of various typical components of a wellbore, such as casing. Wellbore 102 has potential target interval 108. For example, target interval 108 may be an interval of formation 104 upon which it is desired to perform formation testing.

With reference to FIG. 1B, inflatable packer 118 is positioned within cavity 110 of wellbore 102, such that inflatable packer 118 intersects with target interval 108. Inflatable packer 118 includes bladders 120, which are, in FIG. 1B, in a non-expanded configuration. Inflatable packer 118 is coupled with, integrated into, or a portion of string, between upper string portion 114a and lower string portion 114b. For clarity and simplicity, the entire string is not shown.

With reference to FIG. 1C, bladders 120 of inflatable packer 118 are expanded, such that bladders 120 engaged with the walls (e.g., formation and/or casing) of wellbore 102. With bladders 120 engaged with the wellbore 102, isolated wellbore section 122 is defined as a volume of space that at least partially overlaps with target interval 108. When used during formation testing, for example, wellbore section 122 provides dead volume for filtrate and formation fluid 116 to flow into wellbore section 122.

With reference to FIG. 1D, a schematic showing certain components associated with the inflation of the inflatable packers is shown. One skilled in the art would understand that the systems disclosed herein are not limited to the components or arrangement of components shown in FIG. 1D. As shown in FIG. 1D, inflatable packer 118 includes two bladders 120. Each bladder 120 is fluidly coupled with pump 121 through fluid conduits 125, also referred to as setlines. Valve 131, also referred to as a setline valve, is positioned within conduits 125 to regulate the flow of fluid from pump 121 into bladders 120. Valve 131 may be, for example, a solenoid valve. Pressure sensors 129 are positioned to monitor the pressure within bladders 120 and/or along conduits 125. The pressure sensors are not limited to being posited where shown in FIG. 1D, and may be located at another position between pump 121 and bladders 120. Pressure sensors 129 may be in data and/or electrical communication with motor 123 via data communication lines 127 (e.g., copper wire, fiber optics, or another data communication line). While the data communication is shown as occurring over lines 127, one skilled in the art would understand that the data communication may also be wireless in other embodiments. Furthermore, while shown in communication with motor 123, pressure sensors 129 may be in communication with a controller that is, in-turn, in communication with motor. For example, motor 123 may be an electric motor, and may be controlled by a variable frequency drive (VFD), and pressure sensors 129 may be in data communication with the VFD or with a computer, programmed logic controller (PLC), or other controller that is in communication with the VFD. As shown in FIG. 1D, controller 143 is coupled with and/or in communication with motor 123, and is configured to control the speed thereof. Controller 143 may be or include a computer, a PLC, a VFD, or combinations thereof. Controller 143 includes firmware 145 configured to control the operation of motor (e.g., the speed of motor). Firmware 145 may be or include the Savitzky-Golay polynomial filter and the adaptive and automated pressure control algorithm disclosed herein, such that firmware 145 controls the speed of motor 123 in response to pressure data from pressure sensors 129.

Motor 123 drives pump 121 to cause pump to pump fluid (e.g., gas, such as air) into bladders 120 to inflate bladders. During inflation of bladders 120, sensors 129 may monitor pressure and transmit pressure measurements to motor 123 or to a controller in communication with motor 123, such that operation of motor 123 is responsive to the pressure monitored by sensors 129. Once bladders 120 contact the walls of the wellbore, as shown in FIG. 1C, the rate of pressure increase rises because the bladders 120 cannot expand beyond the walls of the wellbore.

FIGS. 2A-7C are graphs of several examples of packer inflations, where the adaptive and automated methods, apparatus and systems for reducing or preventing overshoot pressure disclose herein are not used. In FIGS. 2A-7C, psi, % valve opening, and rpm are plotted with respect to elapsed time.

Figure 2A:
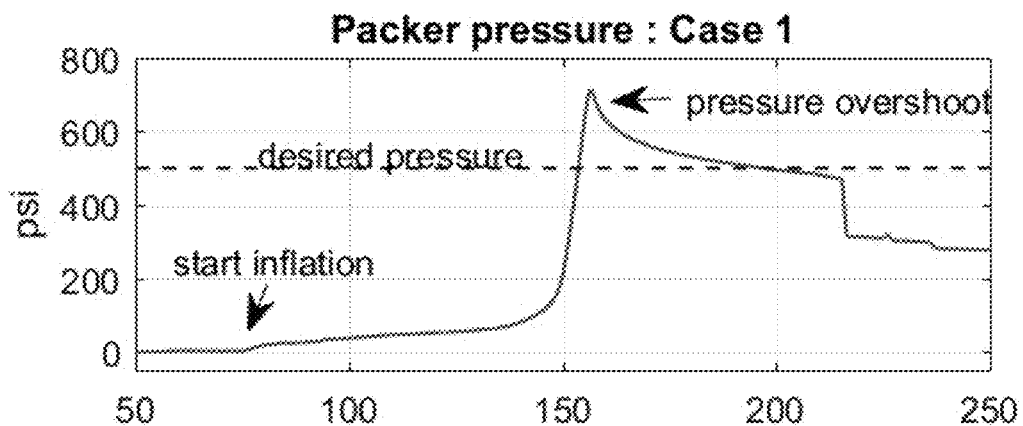
FIGS. 2A-2C are graphs of packer pressure, setline valve position, and motor speed, respectively, each during packer inflation in a first test case (Case 1) performed without using the methods, systems, or apparatus disclosed herein.
Figure 2B:
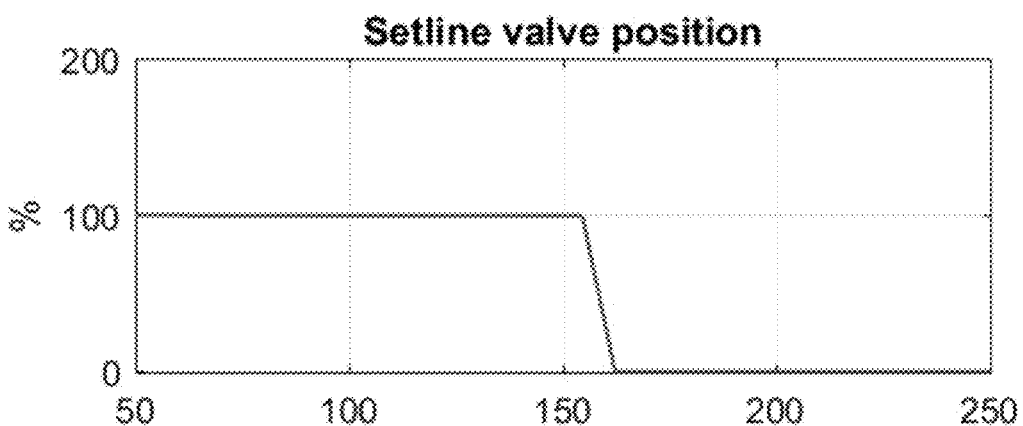
Figure 2C:
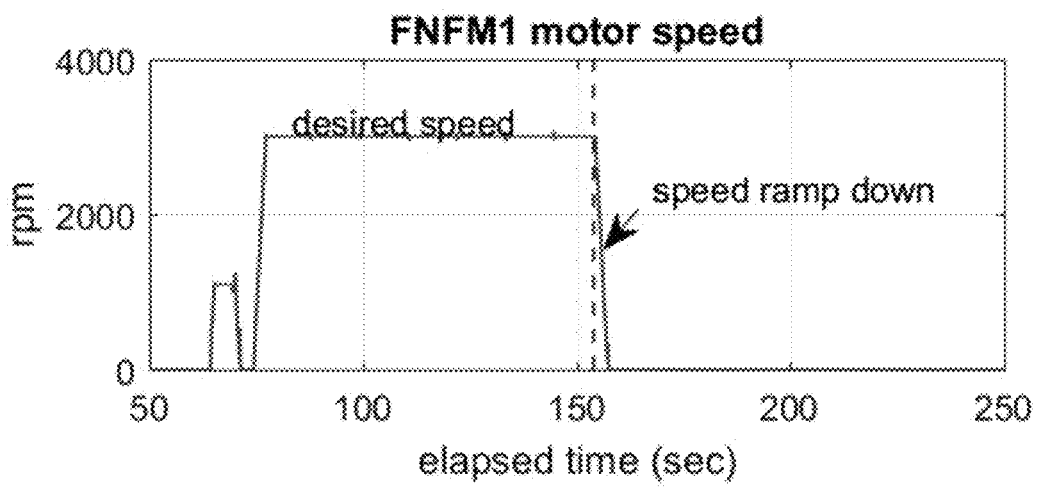
Figure 3A:
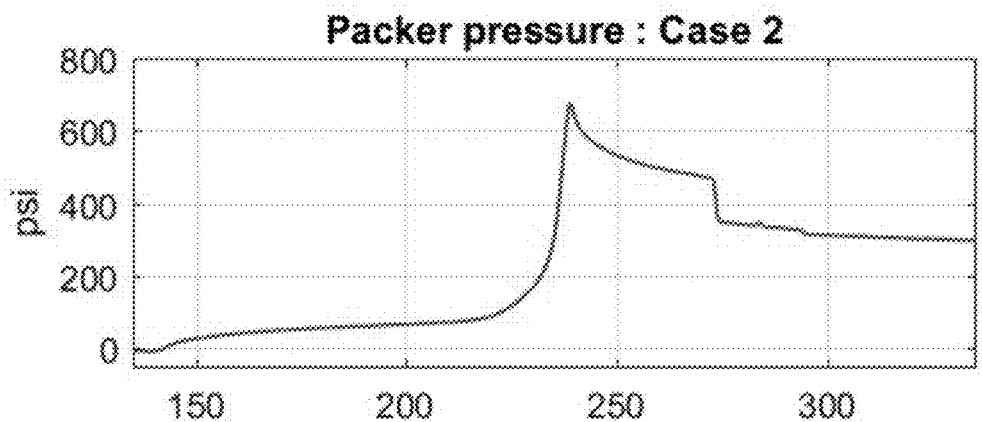
FIGS. 3A-3C are graphs of packer pressure, setline valve position, and motor speed, respectively, each during packer inflation in a second test case (Case 2) performed without using the methods, systems, or apparatus disclosed herein.
Figure 3B:
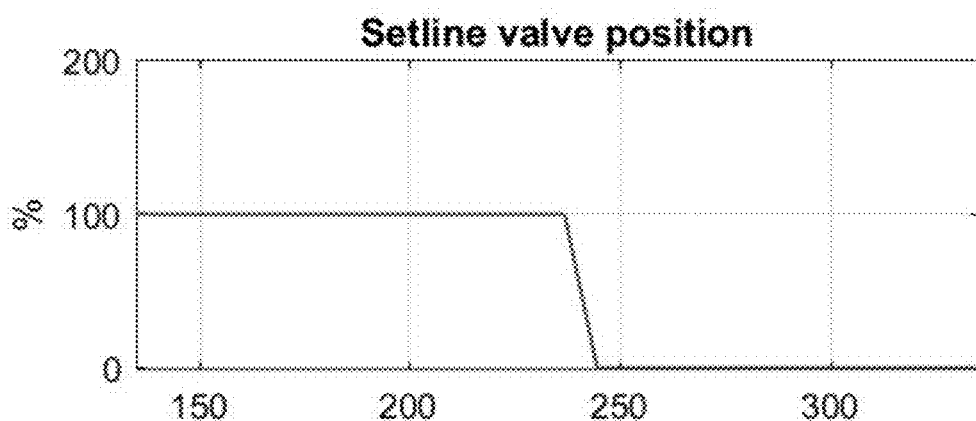
Figure 3C:
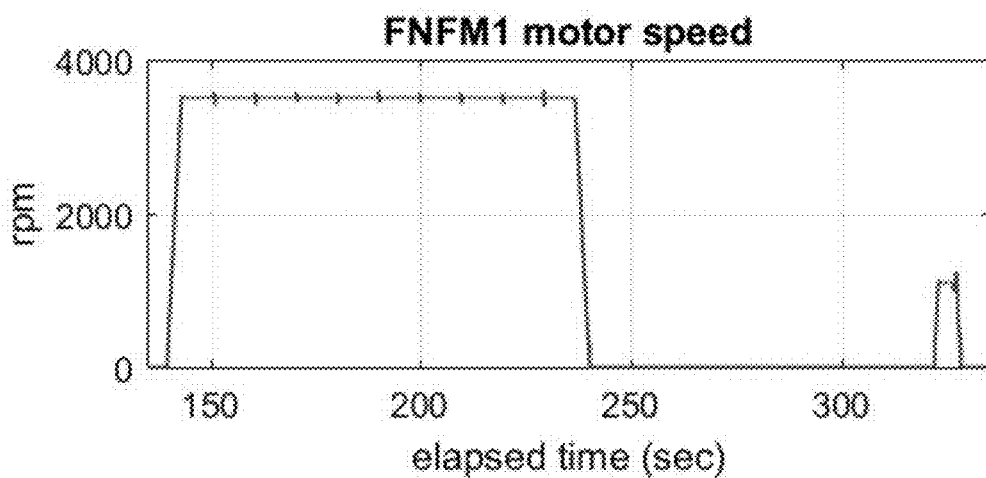
Figure 4A:
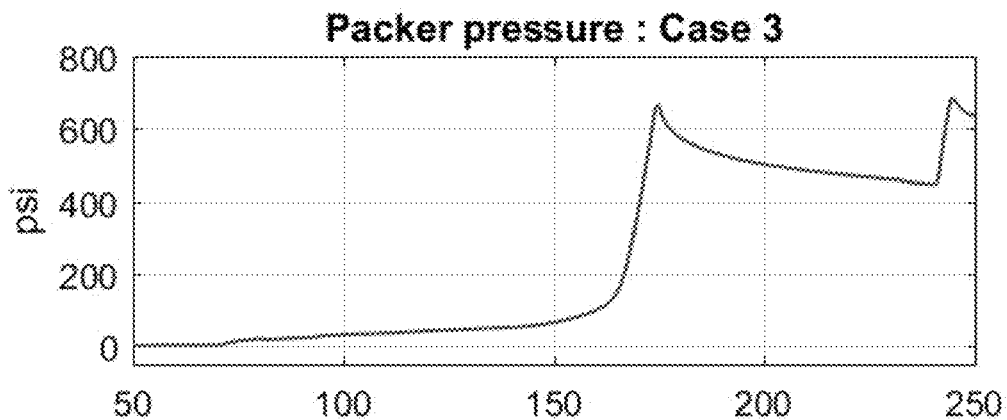
FIGS. 4A-4C are graphs of packer pressure, setline valve position, and motor speed, respectively, each during packer inflation in a third test case (Case 3) performed without using the methods, systems, or apparatus disclosed herein.
Figure 4B:
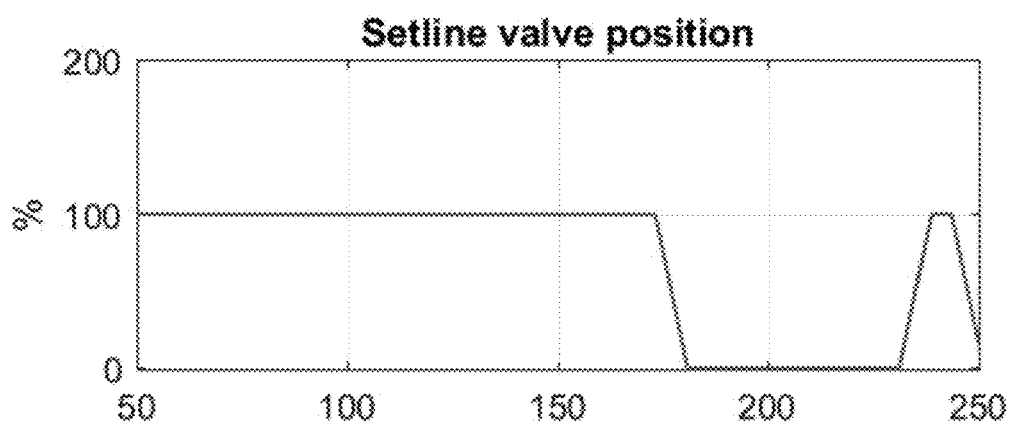
Figure 4C:
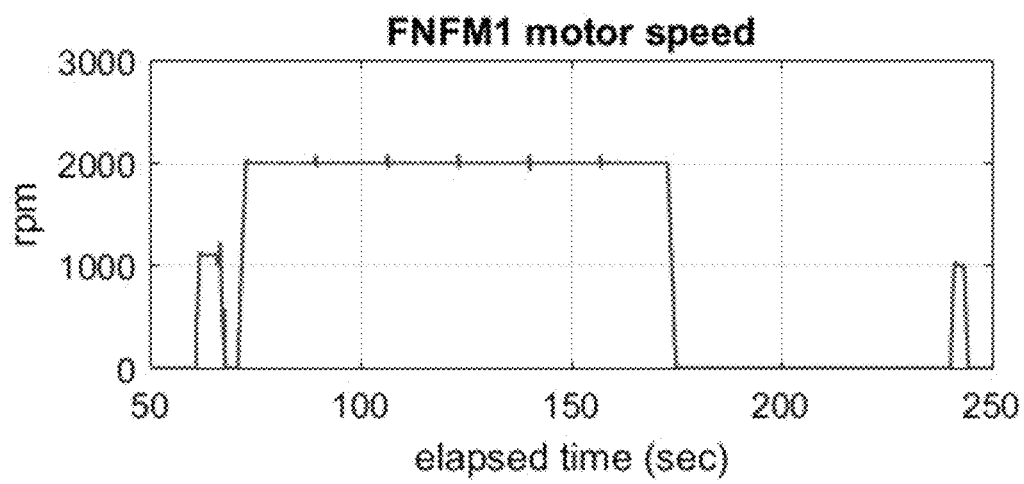
Figure 5A:
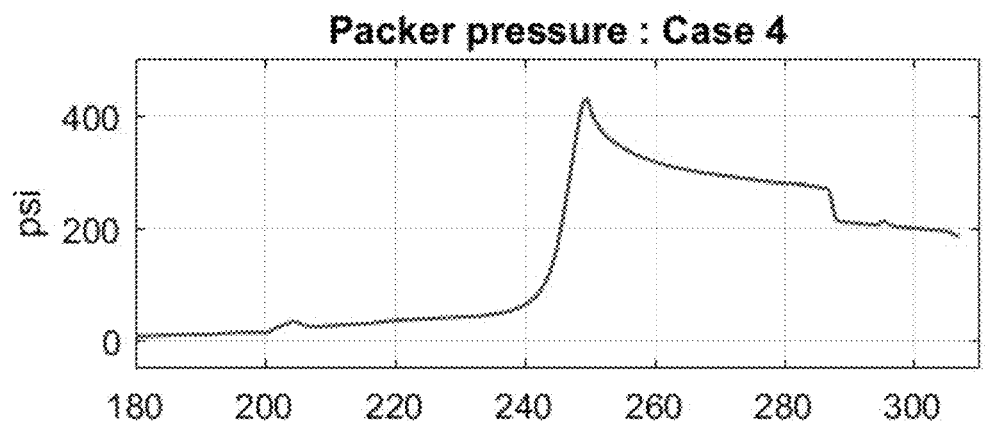
FIGS. 5A-5C are graphs of packer pressure, setline valve position, and motor speed, respectively, each during packer inflation in a fourth test case (Case 4) performed without using the methods, systems, or apparatus disclosed herein.
Figure 5B:
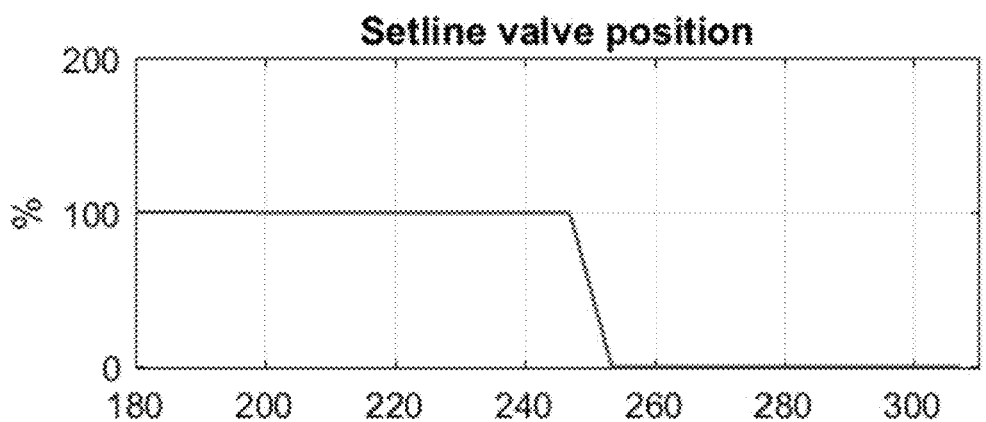
Figure 5C:
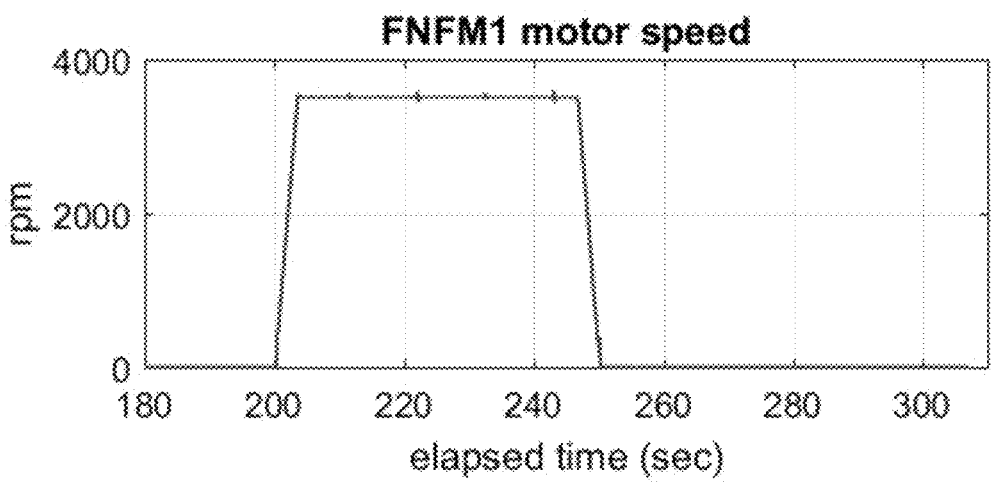
Figure 6A:
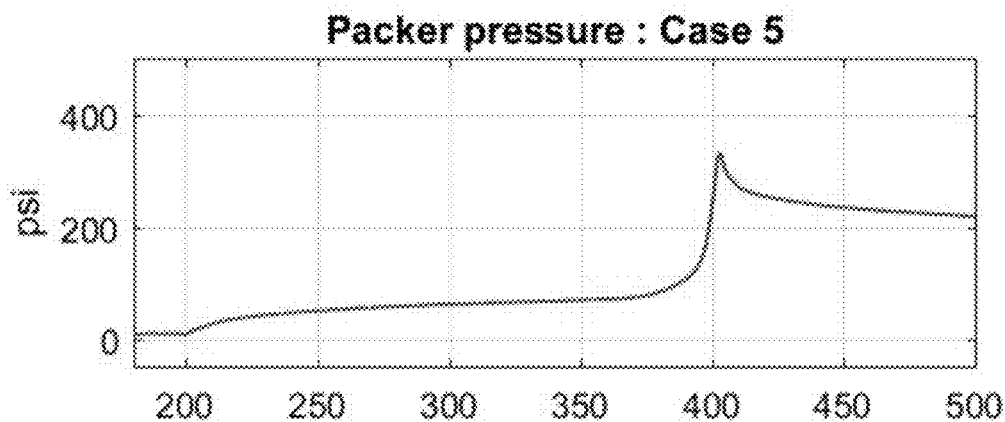
FIGS. 6A-6C are graphs of packer pressure, setline valve position, and motor speed, respectively, each during packer inflation in a fifth test case (Case 5) performed without using the methods, systems, or apparatus disclosed herein.
Figure 6B:
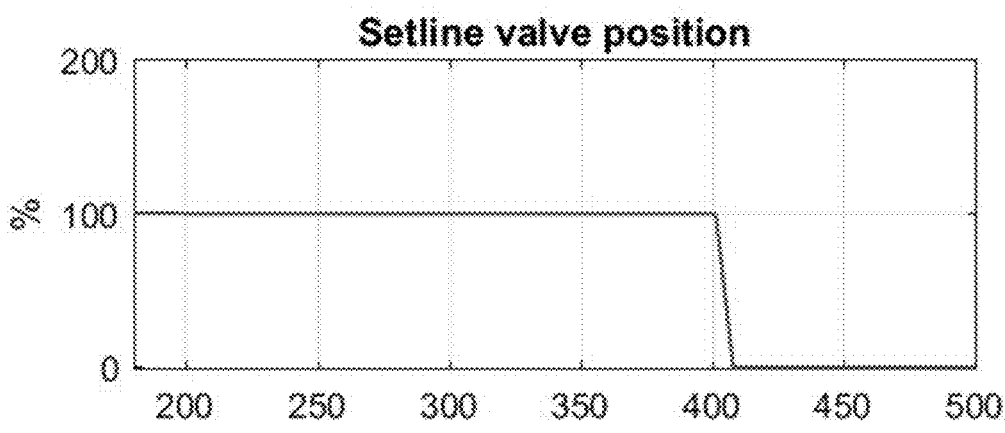
Figure 6C:
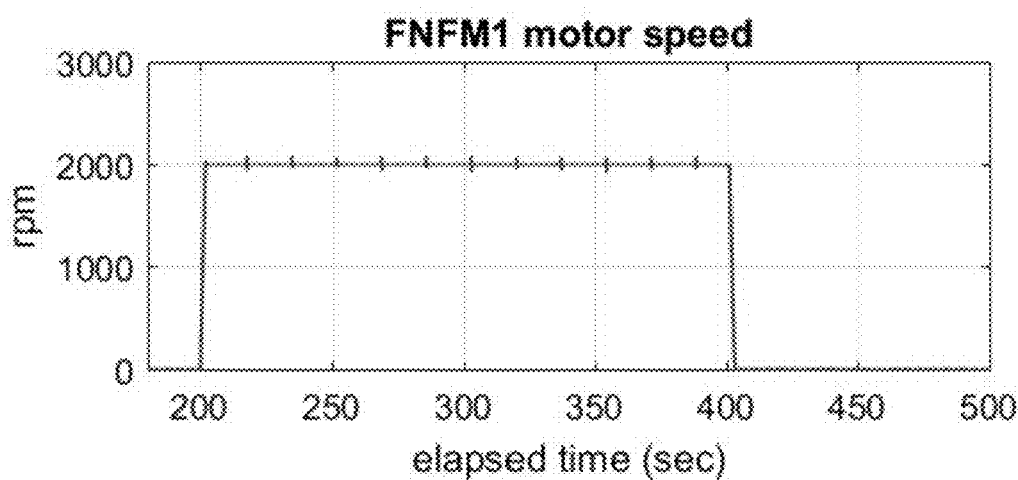
Figure 7A:
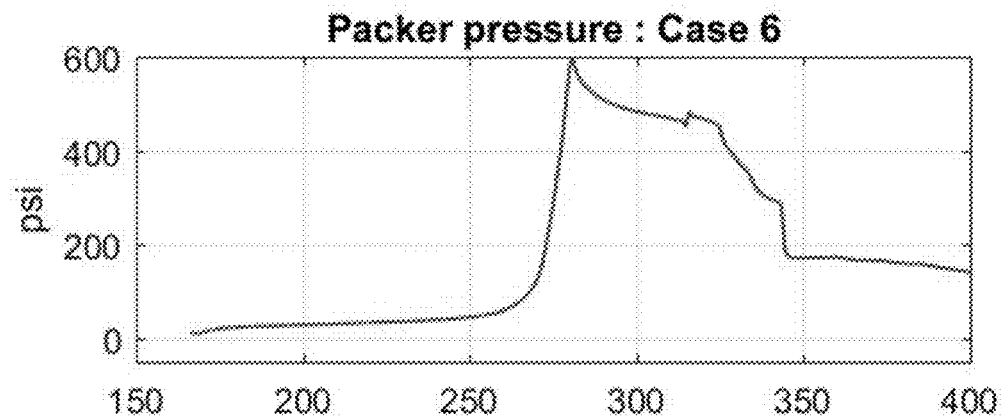
FIGS. 7A-7C are graphs of packer pressure, setline valve position, and motor speed, respectively, each during packer inflation in a sixth test case (Case 6) performed without using the methods, systems, or apparatus disclosed herein.
Figure 7B:
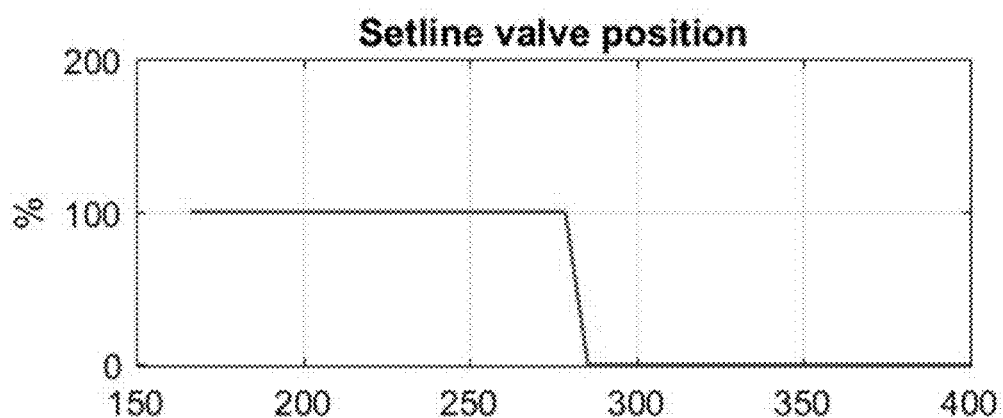
Figure 7C:
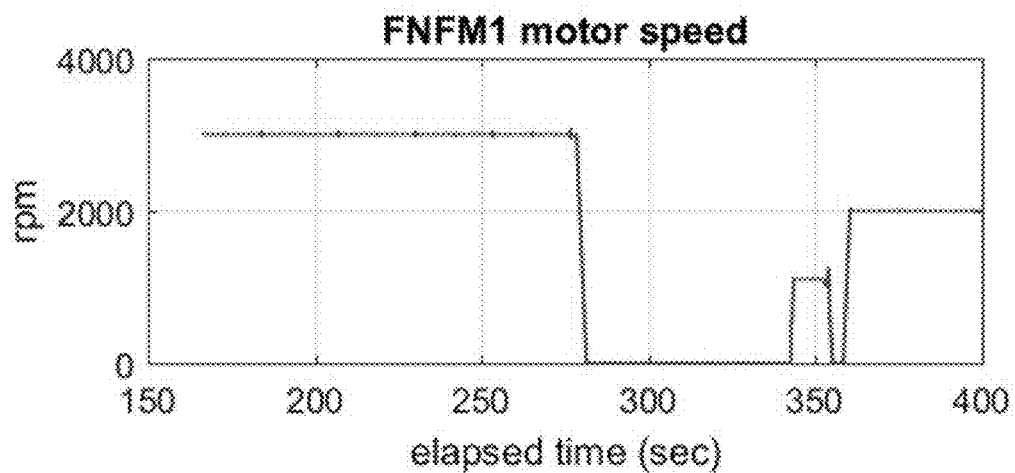

FIGS. 2A-2C are plots of data recorded during the first test case (Case 1) of packer inflation. FIG. 2A is a plot of packer pressure, in psi, vs. time elapsed (in seconds). FIG. 2B is a plot of setline valve position, in percent opened, vs. time elapsed (in seconds). FIG. 2C is a plot of motor speed, in rpm, vs. time elapsed (in seconds). FIGS. 2A-2C demonstrate the characteristics of packer inflation using current schemes, without the adaptive and automated schemes disclosed herein. In Case 1, the specified or desired motor speed is 3000 revolutions per minute (rpm), which is achieved at about 75 seconds, as shown in FIG. 2C. With the motor at the desired motor speed, the inflation of the packer begins at about 75 seconds as well, as indicated in FIG. 2A ("start inflation"). Initially during the inflation, the packers are free to expand, and the pressure within the packers steadily increases, as is evident form about 75 seconds to about 145 seconds. At about 145 seconds, the pressure in the bladders of the packer begins to rise more rapidly than prior to about 145, as shown in FIG. 2A. The desired pressure of Case 1 is indicated in the broken line in FIG. 2A. The packer reaches the desired pressure of 500 psi in about 7-8 seconds after the occurrence of the increase in the rate of pressure change. That is, at about 152 to 153 seconds, the desired pressure is reached, where the plot of the measured pressure (solid line) intersects with the desired pressure (broken line). The ramping down of the motor speed occurs when the desired pressure is reached, such that an overshoot of pressure occurs ("pressure overshoot"). As used herein, a "desired pressure" is the pressure at which the bladders of the packers are to be inflated for operations (e.g., for inflation to isolate a wellbore section). As used herein, a "pressure overshoot" refers to an amount of pressure of the bladders of the packers that is greater than the desired pressure. For example, if the desired pressure is 500 psi and the bladders are inflated to a pressure of 650 psi, then the pressure overshoot is 150 psi.

As used herein, "onset of restraining" refers to the time at which the bladders are inflated to a point that the bladders are engaged with (e.g., touching) the borehole wall. With the bladders engaged with the borehole wall, the borehole wall restrains the bladders from any further free expansion of the bladders. Without being bound by theory, the onset of the rapidly rising pressure, occurring at about 145 seconds in FIG. 2A, is believed to be indicative of the onset of restraining. From the time of the onset of restraining, the packer pressure increases rapidly with pumping (e.g., continuous pumping).

As shown in FIG. 2B, upon the desired pressure being attained, the setline valve position moves from 100% open to 0% open over a finite period of time. The broken line in FIG. 2C indicates the time at which the desired pressure is reached. As is evident from FIG. 2C, the speed of the motor, which is driving the pump, does not begin to slow down until the desired pressure is reached. After the desired pressure is reached, the motor speed is continuously or continually reduced until the motor is no longer running. As the motor keeps running after reaching the desired pressure, albeit at a decreasing rate, the motor correspondingly keeps driving the pump, albeit at a decreasing rate. Thus, additional fluid is pumped into the bladders of the packer, such that the pressure in the packer increases beyond the desired pressure, such that a pressure overshoot occurs.

FIGS. 3A-7C depict similar characteristics of packer inflation for Cases 2-6, respectively. However, the data of the test cases of FIGS. 3A-7C were obtained in different wells, and the motors in the test cases of FIGS. 3A-7C were operated at different motor speeds, ranging from 2000 rpm to 4000 rpm. As is evident from FIGS. 2A-7C, during packer inflation: (1) the packer pressure increases slowly until the onset of restraining occurs; and (2) after the onset of restraining occurs, the packer pressure increases more rapidly than prior to the onset of restraining. Without being bound by theory, it is believed that, without a proper control of the motor, the packers will experience relatively large pressure overshoots, which can deform and damage the packer elements (bladders).

Adaptive and Automated Control Algorithm

In some embodiments, an adaptive and automated control algorithm is used to control the pumping of fluid into the packer elements, such as by controlling the speed of the motor that drives the pump. In some such embodiments, the adaptive and automated control algorithm is firmware stored in a non-transitory storage medium. For example, the adaptive and automated control algorithm may be firmware stored in a non-transitory storage medium of a motor controller that controls the speed of the motor. The motor controller may be or include a computer that includes a processor and non-transitory storage medium, a PLC, a VFD, or combinations thereof.

With reference to FIG. 8A, in some embodiments a step is to detect the onset of restraining while pumping the fluid into the packers, box 812. The onset of restraining can be detected by monitoring the pressure of the bladders, and determining a pressure derivative thereof, as discussed in more detail below.

Once the onset of restraining it is detected, control of the speed of the motor by the adaptive and automated pressure control algorithm is initiated, box 814. The adaptive and automated pressure control algorithm controls the speed of the motor to prevent the pressure in the bladders from overshooting the desired pressure. As would be understood by those skilled in the art, the desired pressure may vary with the inflatable packer used; the wellbore, including the size and ambient conditions within the well, and the operation being carried out (e.g., formatting testing). For example, and without limitation, the desired pressure may range from 100 to 600 psi, from 200 to 500 psi, or from 300 to 400 psi. The desired pressure may be greater than or less than these pressures, depending on the particular application. Also, once the desired pressure is reached in the bladders, the algorithm controls the speed of the motor to maintain the pressure in the packers at the desired pressure or at about the desired pressure, box 816.

In some embodiments, the onset of restraining is determined using a pressure threshold value. That is, once the pressure in the packer exceeds a pressure threshold value, the onset of restraining point is determined to have occurred. For example, with reference to FIG. 9Q, the asterisk indicates a pressure threshold value. As used herein, a "pressure threshold value" is a pressure value that is determined to be indicative of the onset of restraining. In some embodiments, the pressure threshold value is predetermined to be indicative of the onset of restraining. As such, when pressure within the bladders is measured and determined to be equal to or greater than the pressure threshold value, then reducing the speed of the motor is initiated in order to stop the pumping of fluid into the bladders. The pressure threshold value may be less than the desired pressure.

Without being bound by theory, a method of determining the onset of restraining that is believed to be more robust and reliable than using the pressure threshold value, is to use a pressure derivative with respect with time. For example, in some applications, a pressure gauge in the setline may not calibrated well, which can cause bias in the measured pressure value in the packer. Using the pressure derivative, instead of the pressure threshold value, eliminates offsets and biases in the pressure measurements, as offsets and biases do not affect the calculated pressure derivative. In some such embodiments, the pressure derivative is calculated using the Savitzky-Golay polynomial filter. The Savitzky-Golay polynomial filter is disclosed in: A. Savitzky and M. J. E. Golay, "Smoothing and Differentiation of Data by Simplified Least Squares Procedures," Anal. Chem., vol. 36, pp. 1627-1639, 1964.

In some embodiments pressure data of the bladders and/or in the setline is sampled at random or fixed intervals. With the pressure data sampled at fixed intervals, such as every 64 milliseconds, the Savitzky-Golay polynomial filter can be pre-calculated and loaded into a buffer for downhole firmware processing. In one exemplary application, the Savitzky-Golay polynomial filter is designed with a polynomial order of two and a filter length of eleven. Such an exemplary Savitzky-Golay polynomial filter is listed below:

−0.045455
−0.036364
−0.027273
−0.018182
−0.0090909
0.0
0.0090909
0.018182
0.027273
0.036364
0.045455

The above exemplary Savitzky-Golay polynomial filter is anti-symmetric with respect to the middle point (=0.0).

FIG. 8B depicts another simplified flow diagram of the method of inflating a packer disclosed herein. The method includes setting the packer in a wellbore, box 802, and beginning the inflation of the packer, box 804. The method includes monitoring the pressure within the setline, box 806, and determining a pressure derivative of the monitored pressure, over time, box 808. The method includes comparing the monitored pressure to a pressure threshold and comparing the pressure derivative to a derivative threshold, box 810. When the monitored pressure is equal to or greater than the pressure threshold and the pressure derivative is equal to or greater than the derivative threshold, the onset of restraining is detected, box 812. When the onset of restraining is detected, the method includes initiating control of the motor using the adaptive and automated pressure control algorithm, box 814. After initiation of the algorithm, the method includes maintaining the pressure at or near the desired pressure, box 816.

The pressure derivative obtained by applying the Savitzky-Golay polynomial filter to the collected pressure data for Cases 1-6, respectively, are shown in FIGS. 9A-14B, respectively.

Figure 9A:
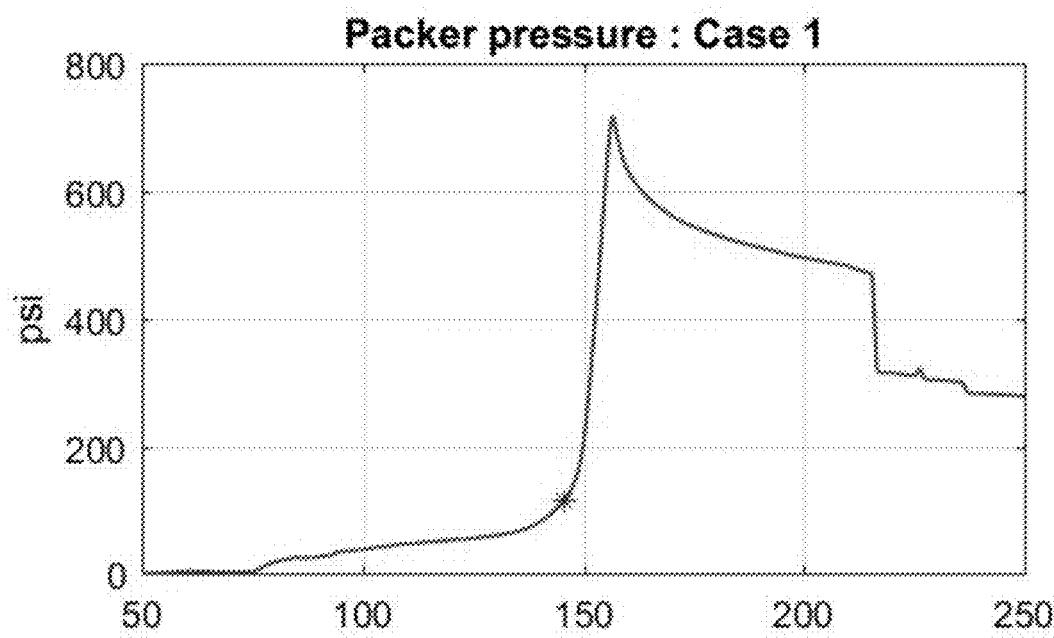
FIG. 9A is a graph of packer pressure of Case 1 showing a detected onset of packer restraint, as indicated by an asterisk.
Figure 9B:
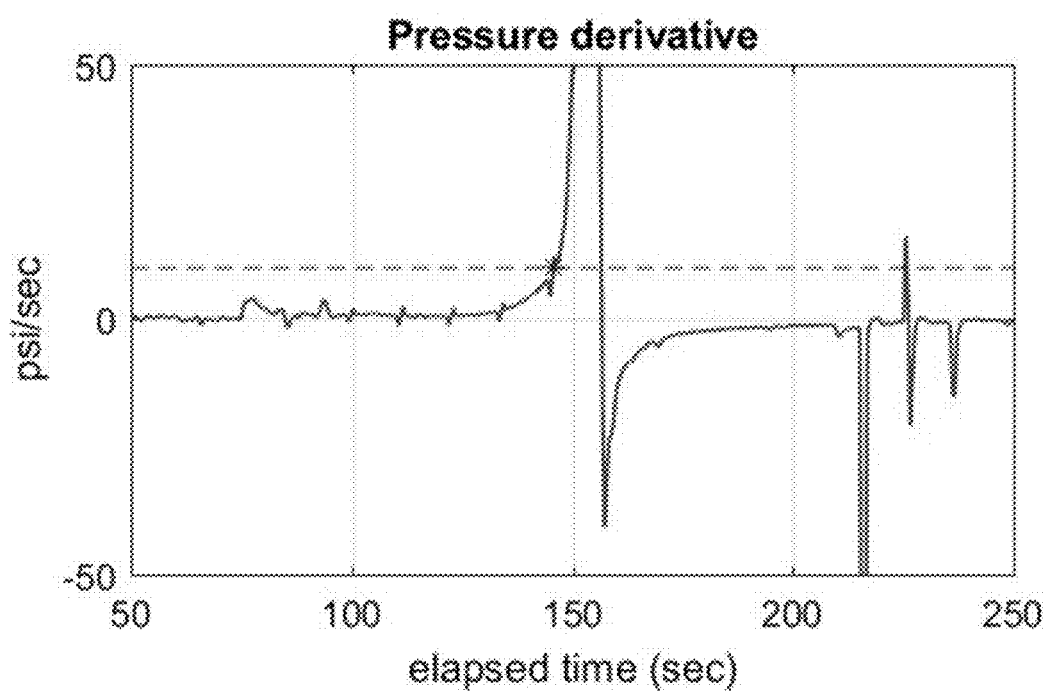
FIG. 9B is a graph of a pressure derivative of the packer pressure of Case 1, as obtained by applying an S-G derivative filter to the data of Case 1, with the broken line indicating a threshold of the pressure derivative.

FIG. 9A is a graph of the packer pressure of Case 1 showing the detected onset of restraining, indicated by an asterisk. FIG. 9B is a graph of the pressure derivative obtained by applying the Savitzky-Golay polynomial filter to the pressure data in Case 1. Pressure over time (psi/seconds) is plotted versus elapsed time (seconds) in FIG. 9B. In FIG. 9B, the solid line is the plot of the pressure derivative, and the broken line indicates the threshold value. The threshold value is 10 psi/sec. The onset of restraining is detected and determined when the calculated pressure derivative exceeds the threshold value. The threshold value of 10 psi/sec was found to be robust and suitable for all of Cases 1-6. That is, prior to the onset of restraining, the pressure derivative was found to remain below or essentially below the rate of 10 psi/sec. The detected onset of restraining indicates the time at which the adaptive pressure control algorithm is initiated. That is, once the pressure derivative exceeds the threshold value, the algorithm instructs the variable frequency drive to begin reducing the speed of the motor to, thereby, reduce the rate of the pumping of fluid into the bladders of the packer.

Figure 10A:
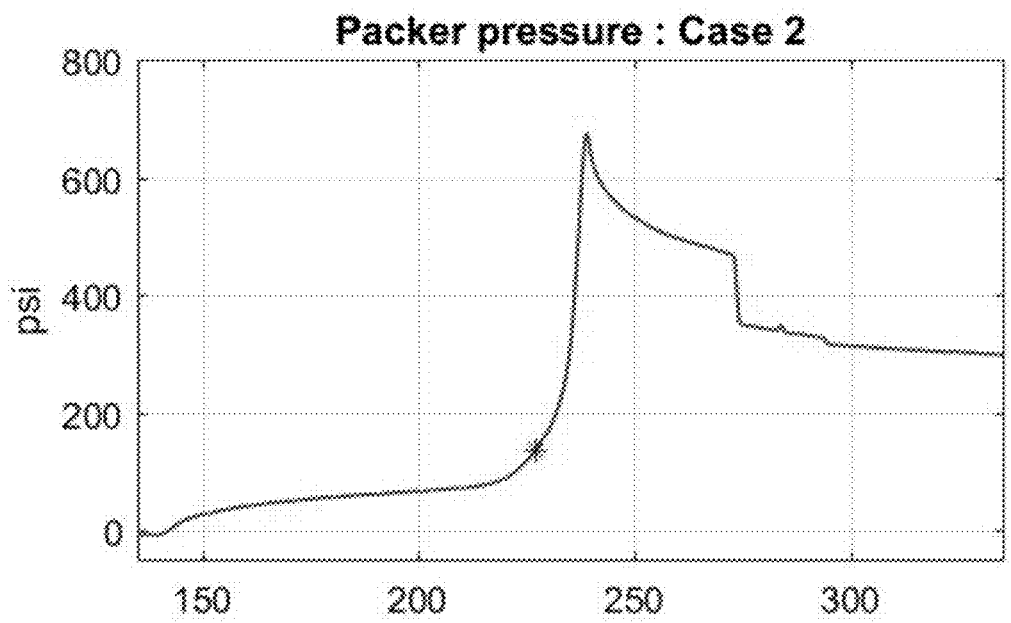
FIG. 10A is a graph of packer pressure of Case 2 showing a detected onset of packer restraint, as indicated by an asterisk.
Figure 10B:
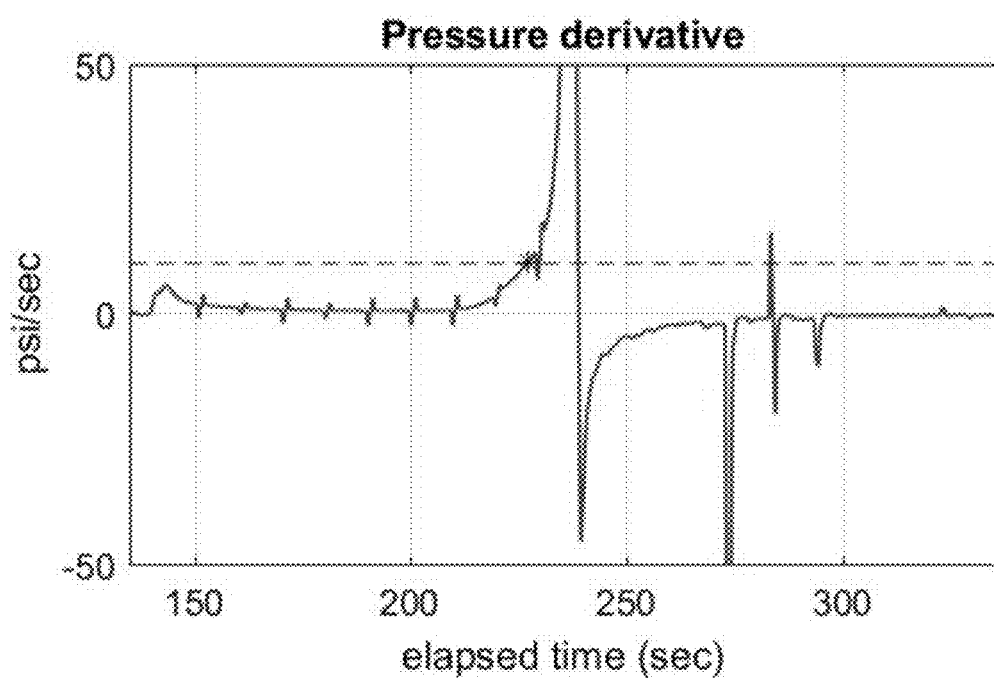
FIG. 10B is a graph of a pressure derivative of the packer pressure of Case 2, as obtained by applying an S-G derivative filter to the data of Case 2, with the broken line indicating a threshold of the pressure derivative.

FIG. 10A is a graph of the packer pressure of Case 2 showing the detected onset of restraining, indicated by an asterisk. FIG. 10B is a graph of the pressure derivative obtained by applying the Savitzky-Golay polynomial filter to the pressure data in Case 2.

Figure 11A:
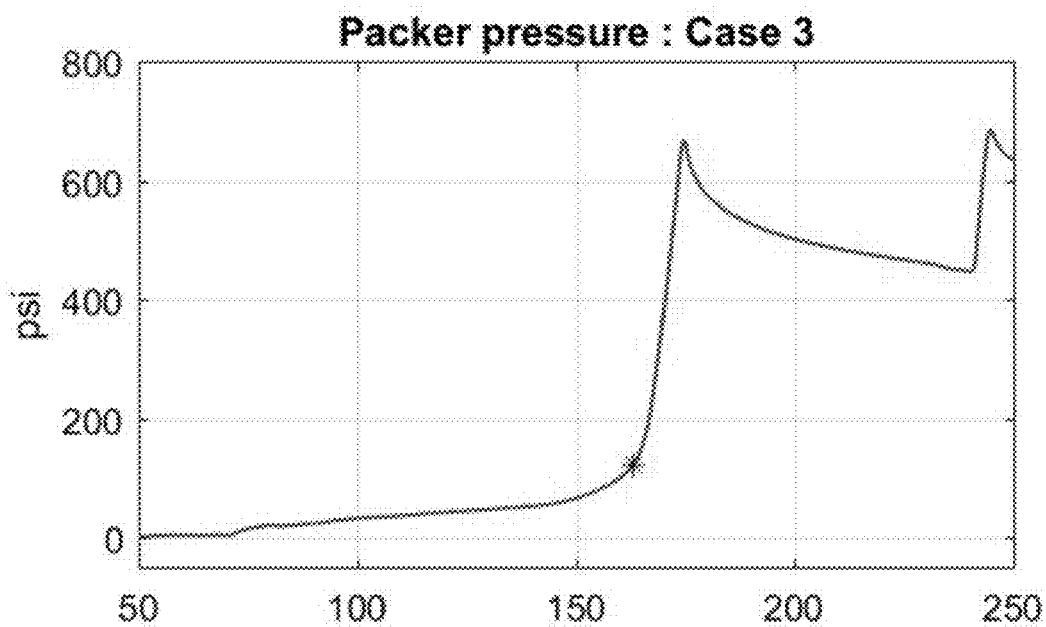
FIG. 11A is a graph of packer pressure of Case 3 showing a detected onset of packer restraint, as indicated by an asterisk.
Figure 11B:
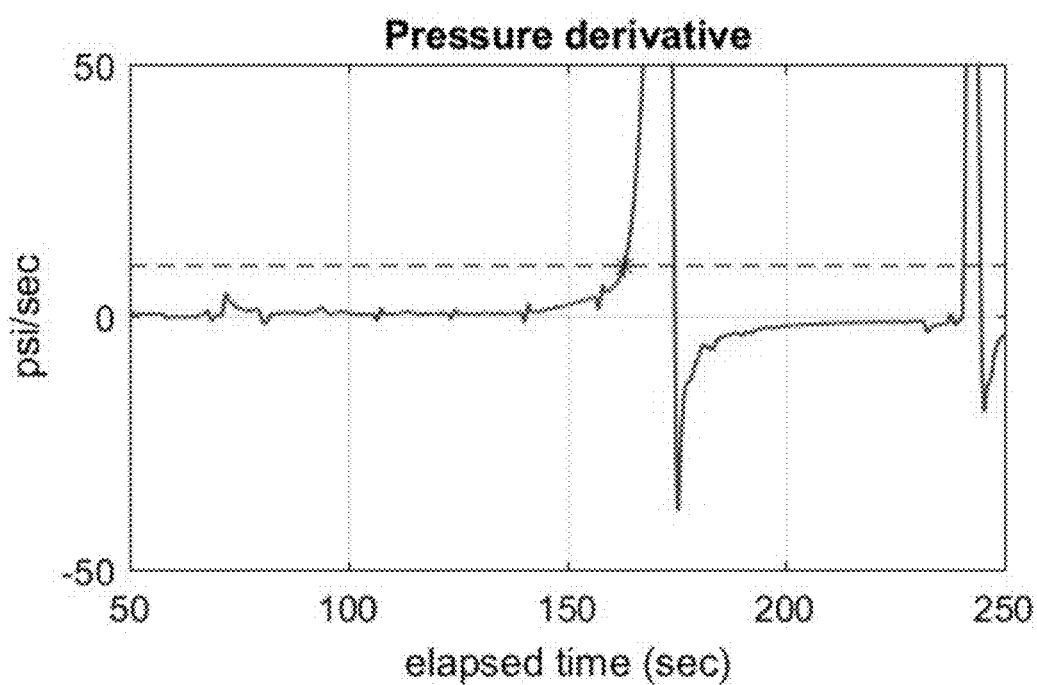
FIG. 11B is a graph of a pressure derivative of the packer pressure of Case 3, as obtained by applying an S-G derivative filter to the data of Case 3, with the broken line indicating a threshold of the pressure derivative.

FIG. 11A is a graph of the packer pressure of Case 3 showing the detected onset of restraining, indicated by an asterisk. FIG. 11B is a graph of the pressure derivative obtained by applying the Savitzky-Golay polynomial filter to the pressure data in Case 3.

Figure 12A:
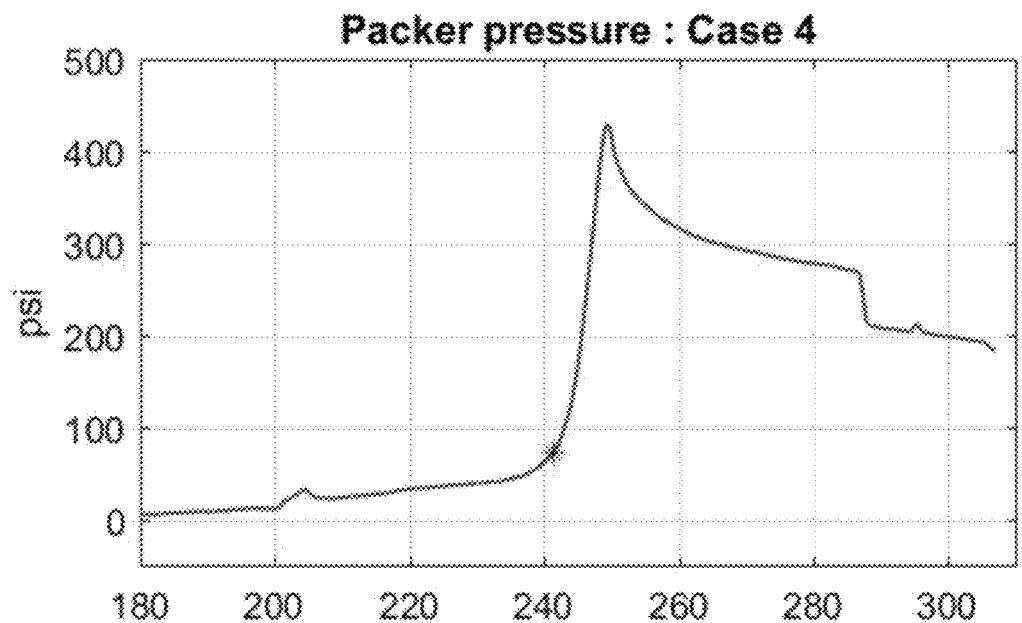
FIG. 12A is a graph of packer pressure of Case 4 showing a detected onset of packer restraint, as indicated by an asterisk.
Figure 12B:
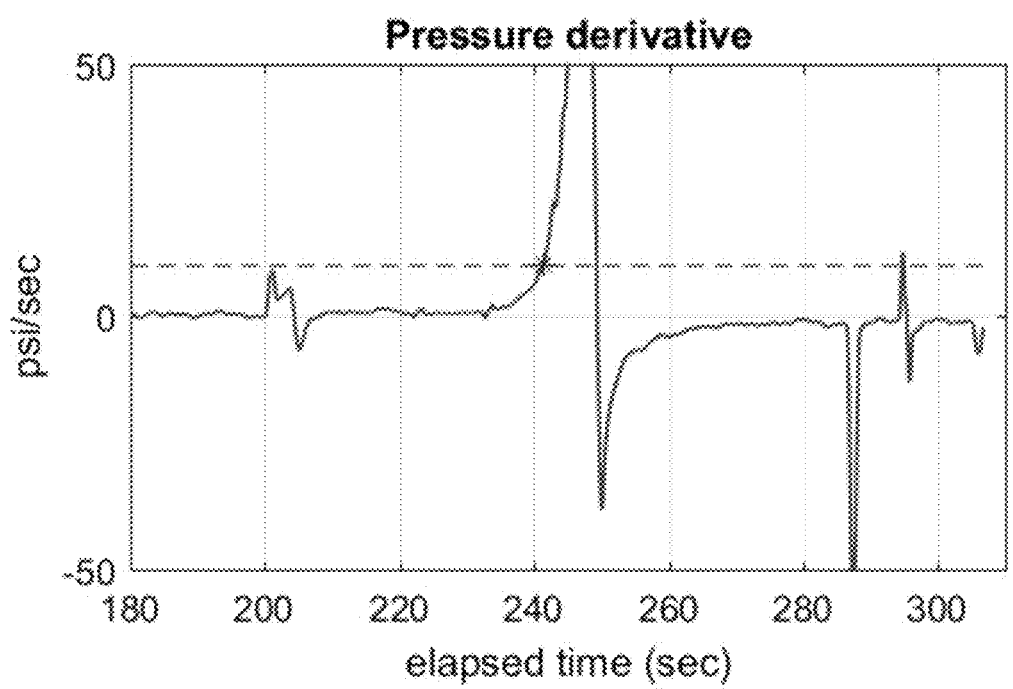
FIG. 12B is a graph of a pressure derivative of the packer pressure of Case 4, as obtained by applying an S-G derivative filter to the data of Case 4, with the broken line indicating a threshold of the pressure derivative.

FIG. 12A is a graph of the packer pressure of Case 4 showing the detected onset of restraining, indicated by an asterisk. FIG. 12B is a graph of the pressure derivative obtained by applying the Savitzky-Golay polynomial filter to the pressure data in Case 4.

Figure 13A:
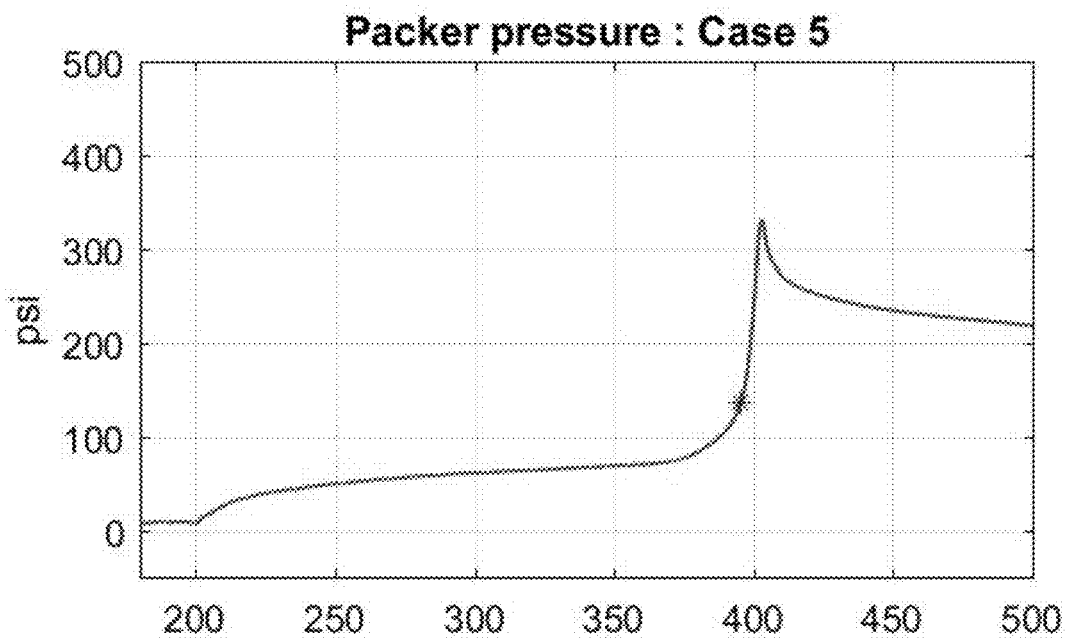
FIG. 13A is a graph of packer pressure of Case 5 showing a detected onset of packer restraint, as indicated by an asterisk.
Figure 13B:
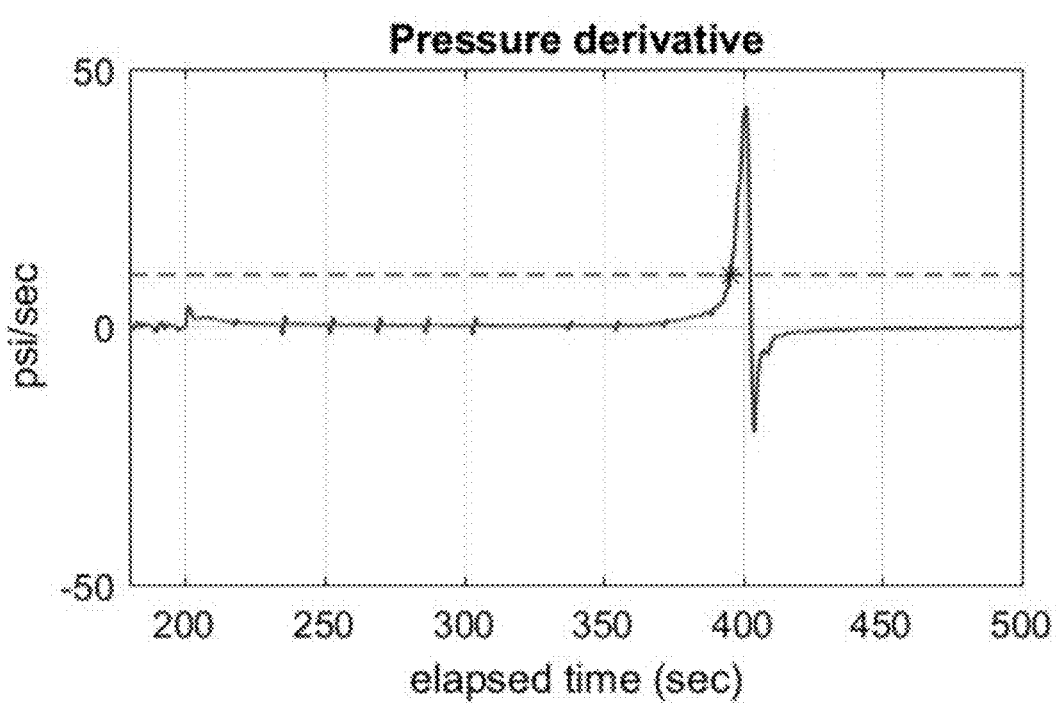
FIG. 13B is a graph of a pressure derivative of the packer pressure of Case 5, as obtained by applying an S-G derivative filter to the data of Case 5, with the broken line indicating a threshold of the pressure derivative.

FIG. 13A is a graph of the packer pressure of Case 5 showing the detected onset of restraining, indicated by an asterisk. FIG. 13B is a graph of the pressure derivative obtained by applying the Savitzky-Golay polynomial filter to the pressure data in Case 5.

Figure 14A:
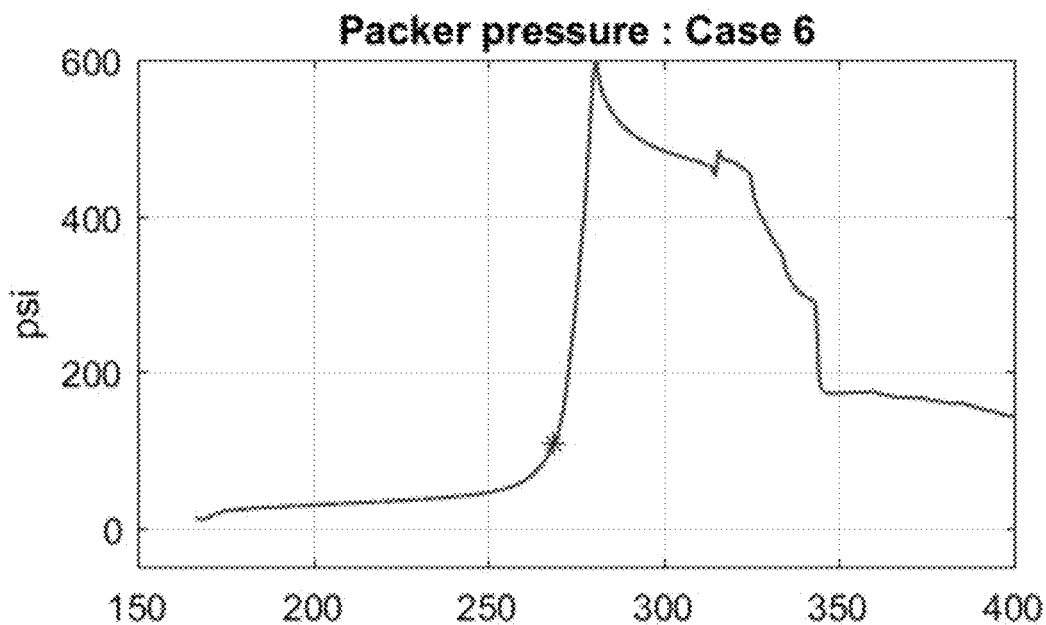
FIG. 14A is a graph of packer pressure of Case 6 showing a detected onset of packer restraint, as indicated by an asterisk.
Figure 14B:
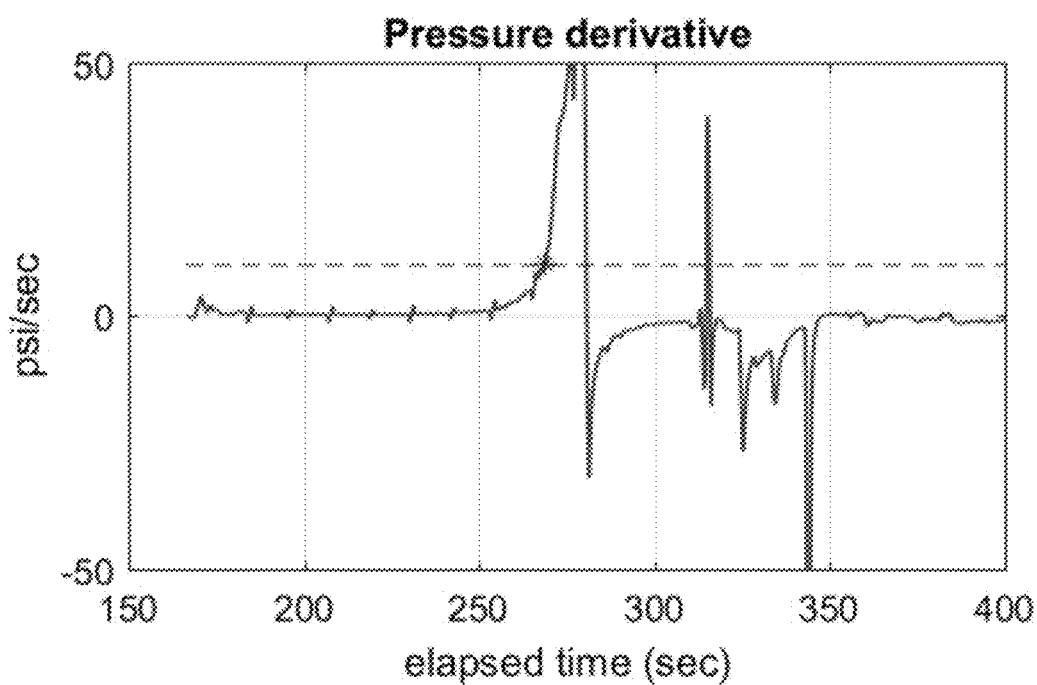
FIG. 14B is a graph of a pressure derivative of the packer pressure of Case 6, as obtained by applying an S-G derivative filter to the data of Case 6, with the broken line indicating a threshold of the pressure derivative.

FIG. 14A is a graph of the packer pressure of Case 6 showing the detected onset of restraining, indicated by an asterisk. FIG. 14B is a graph of the pressure derivative obtained by applying the Savitzky-Golay polynomial filter to the pressure data in Case 6.

The adaptive and automated pressure control algorithm is a proportional control scheme in accordance with the following equation (Equation 1):

$$\omega = \frac{p_d - p}{P_d - P^*}\omega_d + \omega_c \qquad (1)$$

In Equation 1, $p_d$ and $\omega_d$ are the desired pressure and specified motor speed at the beginning of pumping (time=0 seconds), respectively. Further, in Equation 1, p* is the pressure at the detected onset of restraining and $\omega_c$ is a constant speed to maintain the motor in action. The adaptive and automated pressure control algorithm scheme in Equation (1) is applied after the detection of the onset of restraining. Therefore, the required motor speed ω, which is calculated using the packer measured pressure p, begins reducing proportionally after the detection of the onset of restraining is confirmed. Once the measured pressure p reaches the desired pressure $p_d$, the first term on the right-hand side of Equation (1) is zero and the motor, thereafter, is operated at the constant speed $\omega_c$, which is a motor speed that is configured to compensate for decay in the packer pressure, as shown in the graphs associated with Cases 1-6 after the motor is stopped.

Real-Time Implementation

Figure 15:
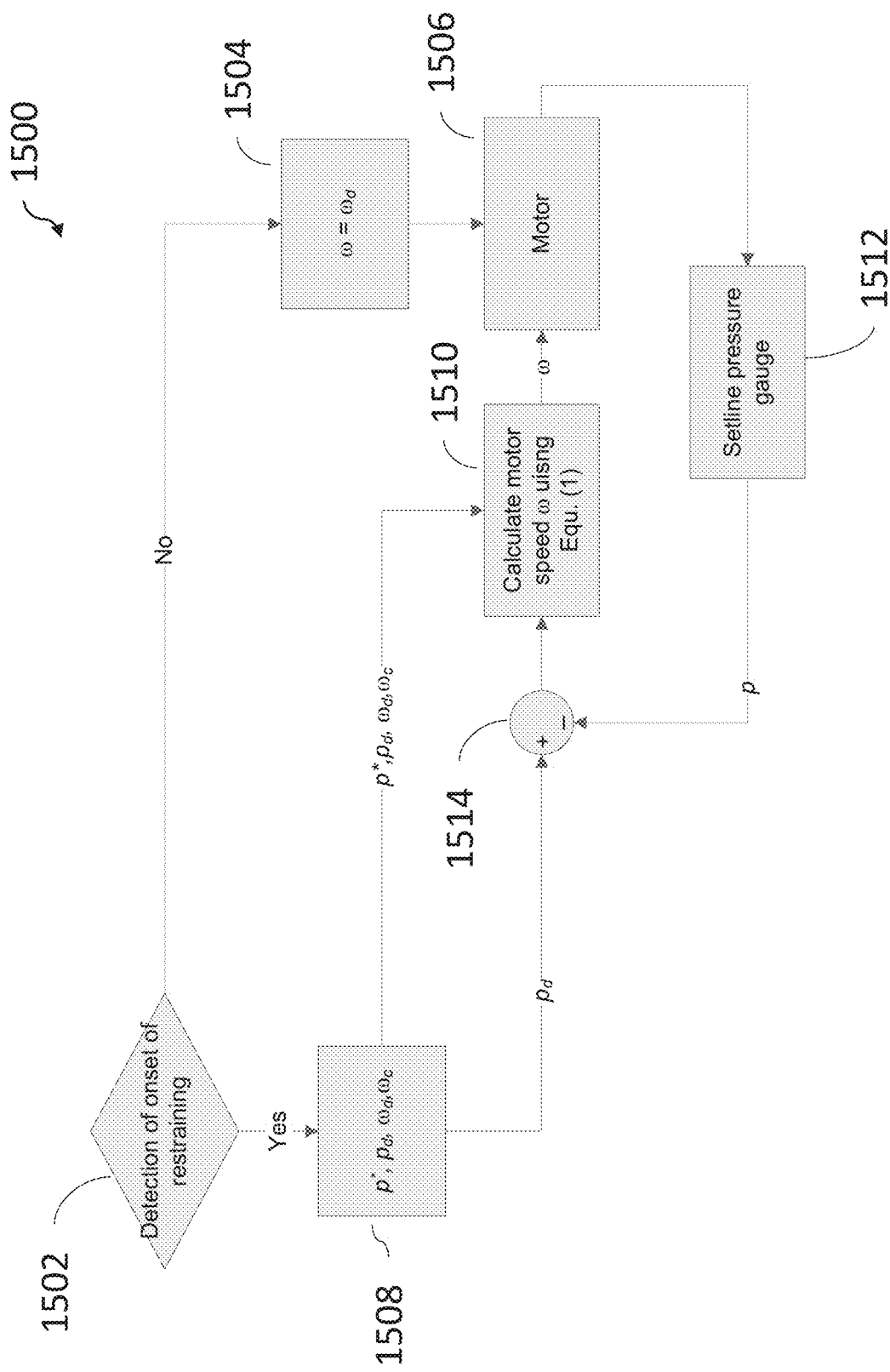
FIG. 15 is a flow diagram of a real-time adaptive and automated pressure control algorithm.

In some embodiments, the adaptive and automated pressure control algorithm is implemented in real-time in downhole firmware. That is, the onset of restraining is detected in real-time, during the inflating of the inflatable packer. With reference to FIG. 15, a flow diagram of one exemplary implementation of the adaptive and automated pressure control algorithm 1500 disclosed herein is shown. A block 1502, detection of onset of restraining occurs. If, at block 1502, the onset of restraining is not detected, then the motor speed of the motor 1506 that drives the pump is set as the specified speed 1504, $\omega_d$. If, at block 1502, the onset of restraining is detected, then parameters 1508 are used to calculate the motor speed based on Equation (1) 1510, and this calculated motor speed is used to drive the pump. The onset of restraining is determined using the Savitzky-Golay polynomial filter. As shown, pressure measurements from setline pressure gauge 1512, which determines the measured pressure, are compared with the desired pressure at 1514.

Figure 16:
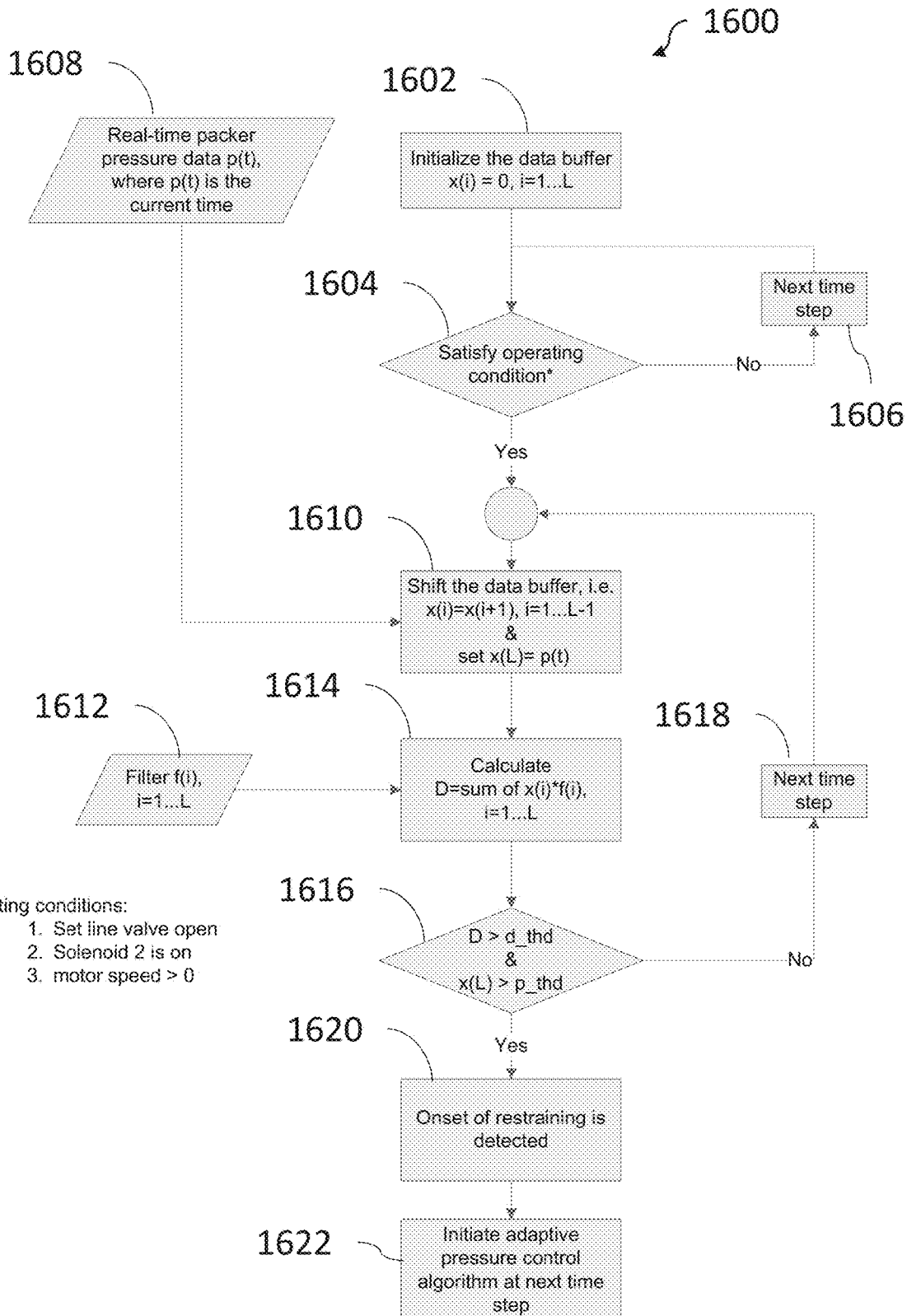
FIG. 16 is a flow diagram of real-time detection of onset of restraining.

With reference to FIG. 16, a flow diagram of another exemplary implementation of the adaptive and automated pressure control algorithm 1600 disclosed herein is shown. In some embodiments, the implementation of the adaptive and automated pressure control algorithm provides a circular buffer of L registers (e.g., L=11). At each sampled time, the buffer is shifted to let the oldest sample in the leftmost register out (i.e., x(i)=x(i+1), i=1, . . . 10) and to let the rightmost register fill with the newest sample (i.e., x(11) =new sample). That is, a register of the 11 most recent pressure measurements taken by the setline pressure gauge are maintained. Subsequently, the inner product of the buffer content is determined using the Savitzky-Golay polynomial filter, which is pre-stored as a portion of the firmware, in accordance with the following equation (Equation 2):

$$D=\Sigma_{i=1}^{i=11}x(i)f(i) \qquad (2)$$

In Equation 2, f(i) is the Savitzky-Golay polynomial filter and D is the calculated pressure derivative. The calculated pressure derivative is the derivative at the 5-sample point (i.e., half-length of Savitzky-Golay polynomial filter). With the pressure data sampled at 64 millisecond intervals, the detection of the onset of restraining is delayed by about 0.3 second (i.e., 5×64 milliseconds 0.3 seconds), which is permissible for certain applications. The detection of the onset of restraining is triggered and determined when the pressure derivation (i.e., D) is larger than the derivative threshold (i.e., d_thd) and the measured pressure (i.e., x(L)) is larger than the pressure threshold (i.e., p_thd). Based on Cases 1-6 disclosed herein, these two thresholds (i.e., the derivative threshold and the pressure threshold) can be reliably set as d_thd=10 psi/sec and p_thd=100 psi.

With reference to FIG. 16, the steps in the flow diagram of the adaptive and automated pressure control algorithm 1600 will now be described. The data buffer is initialized (i.e., x(i)=0, i=1 . . . L), at box 1602. Next, it is determined if certain operating conditions are satisfied, at box 1604. The operating conditions that are satisfied may be, for example: (1) setline valve is open; (2) the solenoid for control of the setline valve tuned on; and (3) the motor speed is greater than 0 rpm. If the operating conditions are not satisfied, then, at the next time step, the operating conditions are checked again, box 1606. The real-time packer pressure data is collected, box 1608, and input into the data buffer, box 1610. The Savitzky-Golay polynomial filter, box 1612, is applied to the data of the data buffer to calculate the pressure derivative, box 1614. The pressure derivative is compared with the pressure derivative threshold and the measured pressure is compared with the pressure threshold, box 1616. If the pressure derivative is lower than the pressure derivative threshold or the measured pressure is lower than the pressure threshold, then the calculation is performed again at the next time step, box 1618. If the pressure derivative is at or higher than the pressure derivative threshold and the measured pressure is at or higher than the pressure threshold, then the onset of restraining is detected, box 1620. If the onset of restraining is detected, then the adaptive and automated pressure control algorithm is initiated at the next time step to control the motor and, thereby, control the pumping up of the packers and the pressure thereof, box 1622.

As would be clear in view of the above discussions, the systems, methods, and apparatus disclosed herein provide for the inflation of packers such that the occurrence of pressure overshoot is reduced or eliminated. While described with reference to the inflation of inflatable packers, the systems, methods, and apparatus disclosed herein may be used in other applications where inflation is used.

Computer Readable Medium

Some embodiments include a computer readable medium (e.g., a data storage, such as a computer hard drive) that can be configured to cause a processor in communication therewith to executed algorithms for the monitoring and/or control of the inflation of inflatable packers. For example, the computer readable medium may be configured to cause a processor in communication therewith to monitor the pressure of the inflatable element, determine of a derivative of the monitored pressure, and execute the pressure control algorithm disclosed herein.

In some embodiments, the computer readable medium (e.g., a non-transitory storage medium) is in communication with a processor. The computer readable medium includes processor-executable instructions stored thereon (e.g., as firmware) that are configured to instruct the processor to execute the pressure control algorithm to control a speed of a motor in response to pressure measurement data. The processor-executable instructions stored on the computer readable medium may include: (1) processor-executable instructions that instruct the processor to receive the pressure measurement data from a pressure sensor positioned to measure pressure of an inflatable element of the inflatable packer; (2) processor-executable instructions that instruct the processor to determine a derivative of the pressure measurement data with respect to time; and (3) processor-executable instructions that instruct the processor to determine a motor speed of a motor that drives a pump that inflates the inflatable element, based on the pressure measurement data and the derivative. In some embodiments, the processor-executable instructions include: processor-executable instructions that instruct the processor to control the speed of the motor, ω, in accordance with the following equation:

$$\omega = \frac{p_d - p}{P_d - P^*}\omega_d + \omega_c \quad (1)$$

In the Equation 1, $p_d$ is a target pressure of the inflatable element, p is the most recently measured pressure of the inflatable element, p* is the measured pressure of the inflatable element at the time that onset of restraining is determined, cod is an initial motor speed, and $\omega_c$ is a constant motor speed to maintain inflation of the inflatable element after reaching the desired pressure.

In some embodiments, the pressure measurement data includes pressure measurements of the inflatable element over time, at fixed intervals, and a buffer of L registers of measured pressure is maintained in the memory, where L is an integral that is equal to or greater than 2 (e.g., 11, or from 2-11). The pressure derivative, D, of the pressure measurements, x, is determined in accordance with the following equation:

$$D = \Sigma_{i=1}^{i=L} x(i) f(i) \quad (2)$$

In the Equation 2, f(i) is the Savitzky-Golay polynomial filter.

EMBODIMENTS

Certain, non-limiting, embodiments will now be set forth.

Embodiment 1. A method for setting an inflatable packer, the method including: positioning an inflatable packer within a borehole; pumping fluid into an inflatable element of the inflatable packer using a pump, wherein the pump is driven by a motor; measuring pressure of the inflatable element; determining a derivative of the measured pressure with respect to time; determining onset of restraining of the inflatable element has occurred when the derivative is equal to or greater than a derivative threshold; and upon or after determining the onset of restraining, turning off the motor or slowing down an rpm of the motor.

Embodiment 2. The method of embodiment 1, wherein the onset of restraining is a time at or after engagement of the inflatable element with a wall of the borehole.

Embodiment 3. The method of embodiment 1 or 2, further including maintaining the pressure of the inflatable element at or about the pressure threshold.

Embodiment 4. The method of any of embodiments 1 to 3, wherein the derivative is calculated using a Savitzky-Golay polynomial filter.

Embodiment 5. The method of any of embodiments 1 to 4, wherein determining onset of restraining of the inflatable element has occurred when the derivative is equal to or greater than the derivative threshold and the measured pressure is equal to or greater than a pressure threshold.

Embodiment 6. The method of embodiment 5, wherein the derivative threshold is 10 psi/sec or less, and wherein the pressure threshold is 100 psi or less.

Embodiment 7. The method of any of embodiments 1 to 6, wherein upon or after determining the onset of restraining, a pressure control algorithm is used to control the speed of the motor, wherein the pressure control algorithm determines a required speed of the motor, ω, in accordance with the following equation:

$$\omega = \frac{p_d - p}{P_d - P^*}\omega_d + \omega_c,$$

wherein $p_d$ is a target pressure of the inflatable element, p is the most recently measured pressure of the inflatable element, p* is the measured pressure of the inflatable element at the time that onset of restraining is determined, $\omega_d$ is an initial motor speed at the beginning of the pumping of the fluid, and co, is a motor speed to maintain inflation of the inflatable element.

Embodiment 8. The method of any of embodiments 1 to 7, wherein the pressure of the inflatable element is measured over time, at fixed intervals, and wherein a buffer of L registers of measured pressure is maintained, wherein L is an integral that is equal to or greater than 2.

Embodiment 9. The method of embodiment 8, wherein the pressure derivative, D, of the pressure measurements, x, is determined in accordance with the following equation: $D = \Sigma_{i=1}^{i=L} x(i) f(i)$, wherein f(i) is the Savitzky-Golay polynomial filter.

Embodiment 10. The method of any of embodiments 1 to 9, wherein the motor is an electric motor coupled with a variable frequency drive, and wherein controlling the speed of the motor includes controlling a voltage applied to the motor using the variable frequency drive.

Embodiment 11. A system for setting an inflatable packer, the system including: an inflatable packer, including an inflatable element; a pump in fluid communication with the inflatable element; a motor, wherein the motor is coupled with the pump to drive the pump; a pressure sensor between the pump and the inflatable element, the pressure sensor positioned to measure pressure of the inflatable element; and a motor controller coupled with the motor, the motor controller including a processor, a computer readable medium in communication with the processor, and processor-executable instructions stored on the computer readable medium that instruct the processor to execute a pressure control algorithm to control a speed of the motor in response to pressure measurement data from the pressure sensor.

Embodiment 12. The system of embodiment 11, wherein the processor-executable instructions include: processor-executable instructions that instruct the processor to determine a derivative of the pressure measured by the pressure sensor with respect to time, and to compare the derivative to a derivative threshold; processor-executable instructions that instruct the processor to compare the pressure measured by the pressure sensor to a pressure threshold; and processor-executable instructions that instruct the processor to, when the derivative is equal to or greater than the derivative threshold and when the pressure measured is equal to or greater than the pressure threshold, determine onset of restraining and turn off or slowdown the motor.

Embodiment 13. The system of embodiment 11 or 12, wherein the motor is an electric motor, and wherein the motor controller includes a variable frequency drive.

Embodiment 14. The system of any of embodiments 11 to 13, wherein the processor-executable instructions include processor-executable instructions that instruct the processor to maintain the pressure of the inflatable element at or about the pressure threshold after the onset of restraining.

Embodiment 15. The system of any of embodiments 11 to 14, wherein the processor-executable instructions including processor-executable instructions that instruct the processor to calculate the derivative using a Savitzky-Golay polynomial filter.

Embodiment 16. The system of any of embodiments 11 to 15, wherein the derivative threshold is 10 psi/sec or less, and wherein the pressure threshold is 100 psi or less.

Embodiment 17. The system of any of embodiments 11 to 16, wherein the processor-executable instructions include processor-executable instructions that instruct the processor to control the speed of the motor, $\omega$, in accordance with the following equation:

$$\omega = \frac{p_d - p}{P_d - P^*}\omega_d + \omega_c,$$

wherein $p_d$ is a target pressure of the inflatable element, p is the most recently measured pressure of the inflatable element, p* is the measured pressure of the inflatable element at the time that onset of restraining is determined, $\omega_d$ is an initial motor speed, and $\omega_c$ is a motor speed to maintain inflation of the inflatable element after the onset of restraining.

Embodiment 18. The system of any of embodiments 11 to 17, wherein the pressure sensor measures the pressure of the inflatable element over time, at fixed intervals, and wherein a buffer of L registers of measured pressure is stored in the computer readable medium, wherein L is an integral that is equal to or greater than 2; and wherein the pressure derivative, D, of the pressure measurements, x, is determined in accordance with the following equation: $D=\Sigma_{i=1}^{i=L}x(i)f(i)$, wherein f(i) is the Savitzky-Golay polynomial filter.

Embodiment 19. A system for setting an inflatable packer, the system including: a computer readable medium; and processor-executable instructions stored on the computer readable medium that are configured to instruct a processor to execute a pressure control algorithm to control a speed of a motor in response to pressure measurement data.

Embodiment 20. The system of embodiment 19, wherein the processor-executable instructions stored on the computer readable medium include: processor-executable instructions that instruct the processor to receive the pressure measurement data from a pressure sensor positioned to measure pressure of an inflatable element of the inflatable packer; processor-executable instructions that instruct the processor to determine a derivative of the pressure measurement data with respect to time; and processor-executable instructions that instruct the processor to determine a motor speed of a motor that drives a pump that inflates the inflatable element, based on the pressure measurement data and the derivative.

Embodiment 21. The system of embodiment 20, wherein the processor-executable instructions that instruct the processor to determine the motor speed of the motor that drives the pump that inflates the inflatable element, based on the pressure measurement data and the derivative includes: processor-executable instructions that instruct the processor to control the speed of the motor, $\omega$, in accordance with the following equation:

$$\omega = \frac{p_d - p}{P_d - P^*}\omega_d + \omega_c,$$

wherein $p_d$ is a target pressure of the inflatable element, p is the most recently measured pressure of the inflatable element, p* is the measured pressure of the inflatable element at the time that onset of restraining is determined, cod is an initial motor speed, and $\omega_c$ is a motor speed to maintain inflation of the inflatable element after the onset of restraining.

Embodiment 22. The system of embodiment 20 or 21, wherein the pressure measurement data includes pressure measurements of the inflatable element over time, at fixed intervals, and wherein a buffer of L registers of measured pressure is maintained in the memory, wherein L is an integral that is equal to or greater than 2; and wherein the pressure derivative, D, of the pressure measurements, x, is determined in accordance with the following equation: $D=\Sigma_{i=1}^{i=L}x(i)f(i)$, wherein f(i) is the Savitzky-Golay polynomial filter.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the processes, machines, manufactures, apparatus, systems, compositions of matter, means, methods and steps described in the specification. As one of ordinary skill in the art will readily appreciate from the disclosure, processes, machines, manufactures, apparatus, systems, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufactures, apparatus, systems, compositions of matter, means, methods, or steps.

What is claimed is:

1. A method for setting an inflatable packer, the method comprising:
    positioning an inflatable packer within a borehole;
    pumping fluid into an inflatable element of the inflatable packer using a pump, wherein the pump is driven by a motor;
    measuring pressure of the inflatable element;
    determining a derivative of the measured pressure with respect to time, wherein the pressure of the inflatable element is measured over time, at fixed intervals, and wherein a buffer of L registers of measured pressure is maintained, wherein L is an integral that is equal to or greater than 2, wherein the pressure derivative, D, of the pressure measurements, x, is determined in accordance with the following equation: $D=\Sigma_{i=1}^{i=L}x(i)f(i)$, and wherein f(i) is the Savitzky-Golay polynomial filter;

determining onset of restraining of the inflatable element has occurred when the derivative is equal to or greater than a derivative threshold; and upon or after determining the onset of restraining, turning off the motor or slowing down an rpm of the motor.

2. The method of claim 1, wherein the onset of restraining is a time at or after engagement of the inflatable element with a wall of the borehole.

3. The method of claim 1, further comprising maintaining the pressure of the inflatable element at or about the pressure threshold.

4. The method of claim 1, wherein the derivative is calculated using a Savitzky-Golay polynomial filter.

5. The method of claim 1, wherein determining onset of restraining of the inflatable element has occurred when the derivative is equal to or greater than the derivative threshold and the measured pressure is equal to or greater than a pressure threshold.

6. The method of claim 5, wherein the derivative threshold is 10 psi/sec or less, and wherein the pressure threshold is 100 psi or less.

7. The method of claim 1, wherein upon or after determining the onset of restraining, a pressure control algorithm is used to control the speed of the motor, wherein the pressure control algorithm determines a required speed of the motor, co, in accordance with the following equation:

$$\omega = \frac{p_d - p}{P_d - P^*}\omega_d + \omega_c$$

wherein $p_d$ is a target pressure of the inflatable element, p is the most recently measured pressure of the inflatable element, p* is the measured pressure of the inflatable element at the time that onset of restraining is determined, $\omega_d$ is an initial motor speed at the beginning of the pumping of the fluid, and $\omega_c$ is a motor speed to maintain inflation of the inflatable element.

8. The method of claim 1, wherein the motor is an electric motor coupled with a variable frequency drive, and wherein controlling the speed of the motor includes controlling a voltage applied to the motor using the variable frequency drive.

9. A system for setting an inflatable packer, the system comprising:

an inflatable packer, including an inflatable element;
a pump in fluid communication with the inflatable element;
a motor, wherein the motor is coupled with the pump to drive the pump;
a pressure sensor between the pump and the inflatable element, the pressure sensor positioned to measure pressure of the inflatable element; and
a motor controller coupled with the motor, the motor controller including a processor, a computer readable medium in communication with the processor, and processor-executable instructions stored on the computer readable medium that instruct the processor to execute a pressure control algorithm to control a speed of the motor in response to pressure measurement data from the pressure sensor, wherein the processor-executable instructions include processor-executable instructions that instruct the processor to control the speed of the motor, ω, in accordance with the following equation:

$$\omega = \frac{p_d - p}{p_d - p^*}\omega_d + \omega_c,$$

wherein $p_d$ is a target pressure of the inflatable element, p is the most recently measured pressure of the inflatable element, p* is the measured pressure of the inflatable element at the time that onset of restraining is determined, cod is an initial motor speed, and $\omega_c$ is a motor speed to maintain inflation of the inflatable element after the onset of restraining.

10. The system of claim 9, wherein the processor-executable instructions include:

processor-executable instructions that instruct the processor to determine a derivative of the pressure measured by the pressure sensor with respect to time, and to compare the derivative to a derivative threshold;
processor-executable instructions that instruct the processor to compare the pressure measured by the pressure sensor to a pressure threshold; and
processor-executable instructions that instruct the processor to, when the derivative is equal to or greater than the derivative threshold and when the pressure measured is equal to or greater than the pressure threshold, determine onset of restraining and turn off or slowdown the motor.

11. The system of claim 9, wherein the motor is an electric motor, and wherein the motor controller includes a variable frequency drive.

12. The system of claim 10, wherein the processor-executable instructions include processor-executable instructions that instruct the processor to maintain the pressure of the inflatable element at or about the pressure threshold after the onset of restraining.

13. The system of claim 10, wherein the processor-executable instructions including processor-executable instructions that instruct the processor to calculate the derivative using a Savitzky-Golay polynomial filter.

14. The system of claim 10, wherein the derivative threshold is 10 psi/sec or less, and wherein the pressure threshold is 100 psi or less.

15. The system of claim 9, wherein the pressure sensor measures the pressure of the inflatable element over time, at fixed intervals, and wherein a buffer of L registers of measured pressure is stored in the computer readable medium, wherein L is an integral that is equal to or greater than 2; and wherein the pressure derivative, D, of the pressure measurements, x, is determined in accordance with the following equation:

$$D=\Sigma_{i=1}^{i=L}x(i)f(i)$$

wherein f(i) is the Savitzky-Golay polynomial filter.

16. A system for setting an inflatable packer, the system comprising:

a computer readable medium; and
processor-executable instructions stored on the computer readable medium that are configured to instruct a processor to execute a pressure control algorithm to control a speed of a motor in response to pressure measurement data, wherein the processor-executable instructions stored on the computer readable medium include:

processor-executable instructions that instruct the processor to receive the pressure measurement data from a pressure sensor positioned to measure pressure of an inflatable element of the inflatable packer;

processor-executable instructions that instruct the processor to determine a derivative of the pressure measurement data with respect to time; and processor-executable instructions that instruct the processor to determine a motor speed of a motor that drives a pump that inflates the inflatable element, based on the pressure measurement data and the derivative, and wherein the pressure measurement data includes pressure measurements of the inflatable element over time, at fixed intervals, and wherein a buffer of L registers of measured pressure is maintained in the memory, wherein L is an integral that is equal to or greater than 2; and wherein the pressure derivative, D, of the pressure measurements, x, is determined in accordance with the following equation: $D = \Sigma_{i=1}^{i=L} x(i) f(i)$, and wherein f(i) is the Savitzky-Golay polynomial filter.

17. The system of claim 16, wherein the processor-executable instructions that instruct the processor to determine the motor speed of the motor that drives the pump that inflates the inflatable element, based on the pressure measurement data and the derivative includes:

processor-executable instructions that instruct the processor to control the speed of the motor, $\omega$, in accordance with the following equation:

$$\omega = \frac{p_d - p}{P_d - P^*} \omega_d + \omega_c$$

wherein $p_d$ is a target pressure of the inflatable element, p is the most recently measured pressure of the inflatable element, p* is the measured pressure of the inflatable element at the time that onset of restraining is determined, $\omega_d$ is an initial motor speed, and $\omega_c$ is a motor speed to maintain inflation of the inflatable element after the onset of restraining.

* * * * *